(12) United States Patent
Rathi et al.

(10) Patent No.: US 8,473,761 B2
(45) Date of Patent: Jun. 25, 2013

(54) ACCESSORY POWER MANAGEMENT

(75) Inventors: Shailesh Rathi, San Jose, CA (US);
Lawrence G. Bolton, Fremont, CA (US); John Ananny, Cupertino, CA (US); Scott Krueger, San Francisco, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 13/467,820

(22) Filed: May 9, 2012

(65) Prior Publication Data

US 2012/0221869 A1    Aug. 30, 2012

Related U.S. Application Data

(62) Division of application No. 13/291,537, filed on Nov. 8, 2011, now Pat. No. 8,230,242, which is a division of application No. 12/695,102, filed on Jan. 27, 2010, now Pat. No. 8,069,356.

(60) Provisional application No. 61/292,689, filed on Jan. 6, 2010.

(51) Int. Cl.
*G06F 1/00* (2006.01)

(52) U.S. Cl.
USPC .......................................... 713/300; 713/340

(58) Field of Classification Search
USPC ......................................................... 713/300
See application file for complete search history.

(56) References Cited

U.S. PATENT DOCUMENTS

| | | | |
|---|---|---|---|
| 5,150,031 A | 9/1992 | James et al. | |
| 5,483,656 A | 1/1996 | Oprescu et al. | |
| 5,532,945 A | 7/1996 | Robinson | |
| 5,754,027 A | 5/1998 | Oglesbee et al. | |
| 5,799,196 A | 8/1998 | Flannery | |
| 5,845,217 A | 12/1998 | Lindell et al. | |
| 6,012,105 A | 1/2000 | Rubbmark et al. | |
| 6,125,455 A | 9/2000 | Yeo | |
| 6,127,809 A | 10/2000 | Kates et al. | |
| 6,130,518 A | 10/2000 | Gabehart et al. | |

(Continued)

FOREIGN PATENT DOCUMENTS

| | | |
|---|---|---|
| WO | 99/26330 A2 | 5/1999 |
| WO | 00/39907 A1 | 7/2000 |

OTHER PUBLICATIONS

International Search Report and Written Opinion corresponding to the PCT application No. PCT/US2010/049921, date of mailing Jan. 28, 2011, 13 pages total.

*Primary Examiner* — Mark Connolly
(74) *Attorney, Agent, or Firm* — Kilpatrick Townsend & Stockton

(57) ABSTRACT

Methods, apparatus, and circuits for managing power among portable computing devices and one or more accessories. One example provides commands to improve power management between a portable computing device and one or more accessories. Other examples provide commands that may allow a portable computing device to charge at a maximum available current level while providing an accessory with sufficient current for its proper operation. Another may help prevent a portable computing device from drawing a high level of current that could be detrimental to an accessory, while others provide commands that may allow a battery pack to instruct a portable computing device to not charge its internal battery. Another example may allow a portable computing device to determine which power supply among multiple power supplies should be used to power an accessory, while others may allow an accessory to retrieve charging current parameters from a portable computing device.

20 Claims, 29 Drawing Sheets

U.S. PATENT DOCUMENTS

| | | |
|---|---|---|
| 6,161,027 A | 12/2000 | Poirel |
| 6,169,387 B1 | 1/2001 | Kaib |
| 6,184,652 B1 | 2/2001 | Yang |
| 6,184,655 B1 | 2/2001 | Malackowski |
| 6,204,637 B1 | 3/2001 | Rengan |
| 6,211,649 B1 | 4/2001 | Matsuda |
| 6,233,625 B1 | 5/2001 | Vander Kamp et al. |
| 6,271,605 B1 | 8/2001 | Carkner et al. |
| 6,316,916 B2 | 11/2001 | Bohne |
| 6,353,894 B1 | 3/2002 | Pione |
| 6,526,287 B1 | 2/2003 | Lee |
| 6,614,232 B1 | 9/2003 | Mukai |
| 6,653,813 B2 | 11/2003 | Khatri |
| 6,653,816 B2 | 11/2003 | Peek et al. |
| 6,663,420 B1 | 12/2003 | Xiao |
| 6,813,528 B1 | 11/2004 | Yang |
| 6,928,568 B2 * | 8/2005 | Breen et al. ............... 713/340 |
| 6,995,963 B2 | 2/2006 | Fadell et al. |
| 7,032,120 B2 | 4/2006 | El-Kik et al. |
| 7,167,935 B2 | 1/2007 | Hellberg |
| 7,215,042 B2 | 5/2007 | Yan |
| 7,293,122 B1 | 11/2007 | Schubert |
| 7,441,062 B2 | 10/2008 | Novotney et al. |
| 7,509,505 B2 | 3/2009 | Randall et al. |
| 7,523,338 B2 | 4/2009 | Fu et al. |
| 7,558,894 B1 | 7/2009 | Lydon et al. |
| 7,581,119 B2 | 8/2009 | Tupman et al. |
| 7,624,202 B2 | 11/2009 | Monks et al. |
| 7,673,020 B2 | 3/2010 | Rosenbloom et al. |
| 7,746,032 B2 | 6/2010 | Tupman et al. |
| 7,770,036 B2 | 8/2010 | Dorogusker et al. |
| 2001/0003205 A1 | 6/2001 | Gilbert |
| 2001/0006884 A1 | 7/2001 | Matsumoto |
| 2002/0132651 A1 | 9/2002 | Jinnouchi |
| 2003/0110403 A1 | 6/2003 | Crutchfield et al. |
| 2003/0220988 A1 | 11/2003 | Hymel |
| 2004/0003300 A1 | 1/2004 | Malueg et al. |
| 2004/0103223 A1 | 5/2004 | Gabehart et al. |
| 2004/0224638 A1 | 11/2004 | Fadell et al. |
| 2006/0117195 A1 * | 6/2006 | Niwa et al. ............... 713/300 |
| 2006/0212726 A1 | 9/2006 | Wang et al. |
| 2007/0046254 A1 | 3/2007 | Chen et al. |
| 2007/0088967 A1 | 4/2007 | Fu et al. |
| 2007/0260896 A1 | 11/2007 | Brundridge et al. |
| 2008/0065246 A1 | 3/2008 | Zorkendorfer et al. |
| 2009/0033277 A1 | 2/2009 | Ludtke |
| 2009/0179768 A1 | 7/2009 | Sander et al. |
| 2010/0042853 A1 * | 2/2010 | Diab et al. ............... 713/300 |
| 2010/0180132 A1 | 7/2010 | Wu et al. |
| 2010/0281183 A1 | 11/2010 | Van Bebber |
| 2010/0318819 A1 * | 12/2010 | Diab ............... 713/300 |
| 2011/0137483 A1 * | 6/2011 | Jenkins et al. ............... 700/293 |
| 2011/0218790 A1 * | 9/2011 | Algaonkar et al. ............... 703/13 |

* cited by examiner

| SYNC 410 | PACKET START 420 | PAYLOAD LENGTH 430 | LINGO ID 440 | COMMAND ID 450 | COMMAND DATA 460 | CHECKSUM 470 |
|---|---|---|---|---|---|---|

Figure 4

| COMMAND | DIRECTION | PAYLOAD |
|---|---|---|
| SetAvailableCurrent | ACC to PCD | Command and current available to PCD |
| SetReserveCurrent | ACC to PCD | Command and current needed by ACC |
| SetMaxCurrent | ACC to PCD | Command and max current provided by ACC |
| SetBatteryCharging | ACC to PCD | Command and battery charging on or off |
| GetPrefPower | ACC to PCD | Command and currents |
| RetPrefPower | PCD to ACC | Preferred source |
| GetChargingInfo | ACC to PCD | Command and charging info requested |
| RetChargingInfo | PCD to ACC | Charging info requested |
| GetUltraHighPower | ACC to PCD | Ultra High Power current requested |
| RetUltraHighPower | PCD to ACC | Ultra High Power current |

Figure 8

ACCESSORY POWER MANAGEMENT

CROSS-REFERENCES TO RELATED APPLICATIONS

This application is a divisional of U.S. application Ser. No. 13/291,537, filed Nov. 8, 2011, which is a divisional of U.S. application Ser. No. 12/695,102, filed Jan. 27, 2010, which claims the benefit and priority under 35 U.S.C. 119(e) of U.S. Provisional Patent Application No. 61/292,689, filed Jan. 6, 2010. The respective disclosures of these applications are incorporated herein by reference for all purposes.

BACKGROUND

The popularity of various portable electronic devices has exploded the past several years and the public's fascination and desire for new devices shows no signs of abating. Along with this increase in popularity, the number of types of these portable devices has grown considerably, and the functionality of these devices has diversified tremendously.

Interestingly, this diversification has become so thorough that it has begun to lead to a convergence. One such convergence is occurring with portable computing devices.

Smaller devices, such as phones, can now be used to perform functions that were previously limited to larger computing devices. These go beyond native functions, such as actually calling people, and include listening to music, watching movies, viewing documents, surfing the web, and reading email. Larger devices, such as netbooks, are slimming down to ultraportable size by jettisoning their optical drives and other functionality.

The evolution of these devices is thus converging towards a common destination: the portable computing device. These portable computing devices may handle various functions currently assigned to phones and netbooks. They may be used to listen to music, watch movies, view and edit documents, surf the web, read email and books, as well as myriad other functions.

Users of these portable computing devices often place them in a docking station. These docking stations may provide mechanical support for the portable computing devices, holding them in place in a roughly upright manner so that the screen can be viewed easily. Other accessories may be used with these portable computing devices as well. These accessories often provide power to the portable computing device, which is used to run circuitry on the portable computing device and to charge its internal battery.

These portable computing devices have comparatively large batteries and a correspondingly large current is required to charge them. But while the portable computing device's batteries are charging, the accessories require current for their operation. Also, some accessories may only be able to safely supply a certain amount of current.

Thus, what is needed are methods, apparatus, and circuits for managing power among these portable computing devices and one or more accessories.

SUMMARY

Accordingly, embodiments of the present invention provide methods, apparatus, and circuits for managing power among portable computing devices and one or more accessories. An illustrative embodiment of the present invention provides a set of commands and supporting circuitry that provides improved power management between a portable computing device and one or more accessories.

An illustrative embodiment of the present invention provides commands that may allow a portable computing device to charge at a maximum available current level while providing an accessory with sufficient current for its proper operation. Another illustrative embodiment of the present invention may help prevent a portable computing device from drawing a high level of current that could be detrimental to an accessory, such as a cable. Another illustrative embodiment of the present invention may allow a battery pack or other accessory to instruct a portable computing device to not charge its internal battery. Another illustrative embodiment of the present invention may allow a portable computing device to determine which power supply among multiple power supplies should be used to power an accessory. Yet another illustrative embodiment of the present invention may allow an accessory to get charging current parameters from a portable computing device.

One illustrative embodiment of the present invention provides a method of operating an accessory. In this method, the accessory may establish a connection with a portable computing device and receives power from an external power source. The accessory may determine a current capability of the external power source, and then may determine a net current capability by deducting a current requirement of the accessory from the current capability of the external power source. The accessory may then signal to the portable computing device that the portable computing device is to draw a current having a limit equal to the net current capability.

Another illustrative embodiment of the present invention provides a method of operating a portable computing device. In this method, the portable computing device may establish a connection with an accessory. The portable computing device may then receive an indication of a current capability of an external power source powering the accessory. The portable computing device may also receive a power instruction from the accessory, where the power instruction may indicate a current requirement of the accessory. The portable computing device may then determine a net current capability by deducting the current requirement of the accessory from the current capability of the external power source. A current having a limit equal to the net current capability may then be drawn by the portable computing device.

Another illustrative embodiment of the present invention provides another method of operating a portable computing device. This method may include establishing a connection with a power source via a cable, receiving an indication that the power source can supply current at first level, receiving an indication that the cable can supply current at a lower second level, and drawing a current having a limit equal to the lower second level.

Another illustrative embodiment of the present invention provides a method of operating a portable computing device. This method may include establishing a connection with a battery pack, receiving a command to operate circuitry using current from the battery pack without charging the internal battery, and drawing a current to operate the internal circuitry without charging the internal battery.

Another illustrative embodiment of the present invention provides a method of operating an accessory. In this method, the accessory may establish a connection with a portable computing device. The accessory may then provide a request to the portable computing device inquiring whether the accessory should use a first power source or a second power source to power the accessory. The accessory may then receive an instruction indicating which power source to use to power the accessory. The accessory may then use the indicated power source to power itself.

Yet another illustrative embodiment of the present invention provides a method of operating an accessory. This method may include establishing a connection with a portable computing device, providing a request for a charging parameter to the portable computing device, and receiving the charging parameter from the portable computing device.

Still another illustrative embodiment of the present invention provides a method of operating a portable computing device. This method may include establishing a connection with an accessory, reading a resistor identification on the accessory, determining a set of one or more default values based on the resistor identification, receiving a command from the accessory to modify the set of one or more default values, and modifying the set of one or more default values.

Various embodiments of the present invention may incorporate one or more of these and the other features described herein. A better understanding of the nature and advantages of the present invention may be gained by reference to the following detailed description and the accompanying drawings.

BRIEF DESCRIPTION OF THE DRAWINGS

FIG. 4 illustrates a packet format that may be employed by an embodiment of the present invention;

FIG. 8 is a table listing commands employed by various embodiments of the present invention to manage power between an accessory and a portable computing device;

DESCRIPTION OF ILLUSTRATIVE EMBODIMENTS

Figure 1:
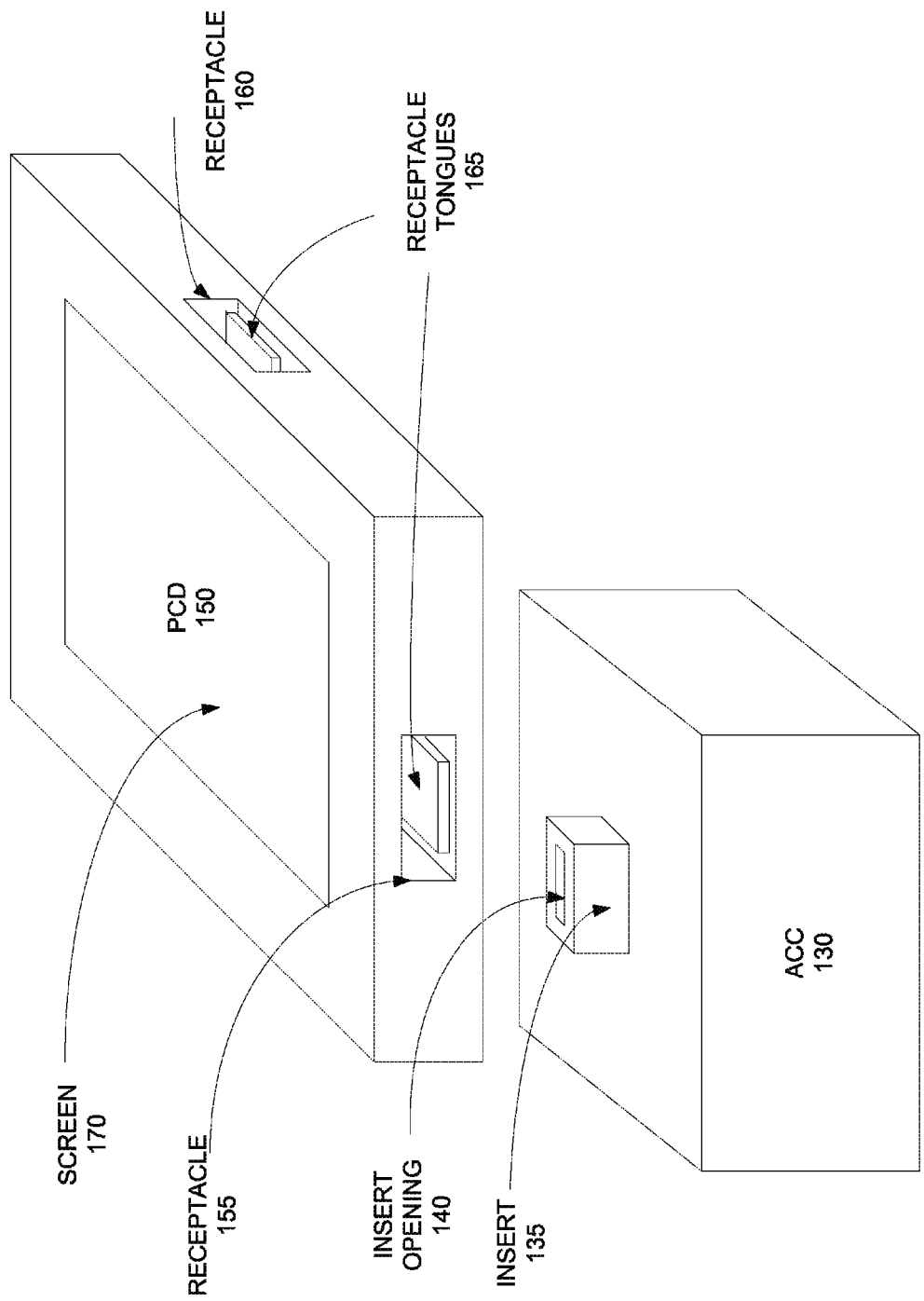
FIG. 1 illustrates an electronic system that may be improved by the incorporation of embodiments of the present invention.

FIG. 1 illustrates an electronic system that may be improved by the incorporation of embodiments of the present invention. This figure, as with the other included figures, is shown for illustrative purposes only, and does not limit either the possible embodiments of the present invention or the claims.

This figure includes portable computing device 150 and accessory 130. In this example, accessory 130 is a docking station, though in other examples accessory 130 may be other types of devices, such as radios, monitors, interactive displays, and others. In this example, portable computing device 150 is a tablet computer, though in other systems it may be other types of devices, such as a portable media player, cell phone, monitor, or other electronic device.

Accessory 130 may include insert 135 having insert opening 140. Portable computing device 150 may have one or more receptacles 155 and 160. These receptacles 155 and 160 may include receptacle tongues 165. When portable computing device 150 is mated with accessory 130, insert 135 may fit in either receptacle 155 or 160. The corresponding receptacle tongue 165 may fit into insert opening 140. Contacts (not shown) on receptacle tongue 165 form electrical connections with contacts in insert opening 140. These electrical connections form pathways for power and signals that may be shared between accessory 130 and portable computing device 150.

Accessory 130 and portable computing device 150 may include various electronic circuitry for managing and sharing power and data signals. Examples of these circuits are shown in the following figure.

Figure 2:
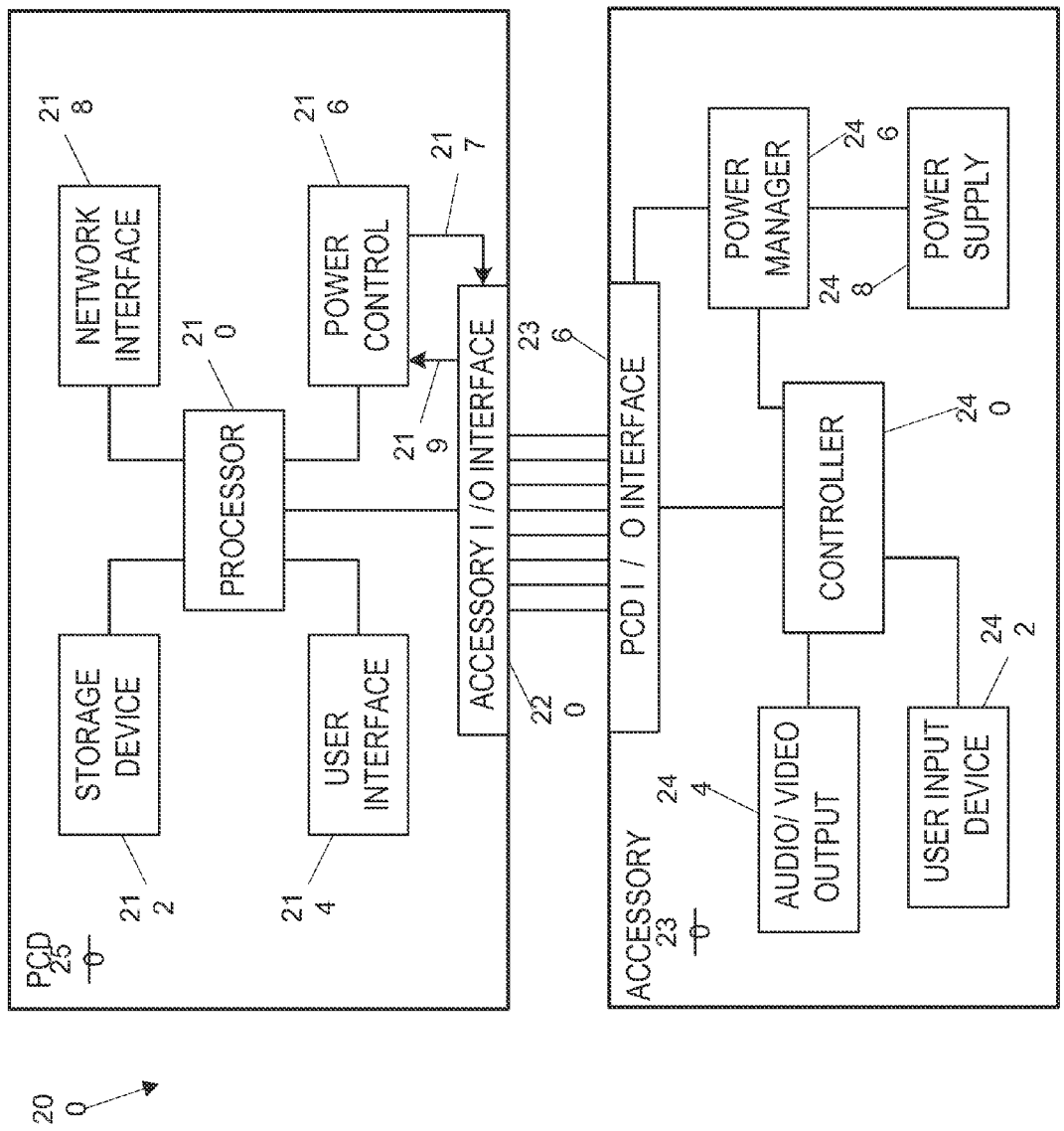
FIG. 2 is a simplified block diagram of a system including a portable computing device and an accessory according to an embodiment of the present invention.

FIG. 2 is a simplified block diagram of a system 200 including portable computing device 250 and accessory 230 according to an embodiment of the present invention. In this embodiment, portable computing device 250 (e.g., implementing portable computing device 150 of FIG. 1) can provide computing, communication and/or media playback capability. Portable computing device 250 can include processor 210, storage device 212, user interface 214, power control 216, network interface 218, and accessory input/output (I/O) interface 220. Portable computing device 250 can also include other components (not explicitly shown) to provide various enhanced capabilities.

Storage device 212 can be implemented using disk, flash memory, or any other non-volatile storage medium. In some embodiments, storage device 212 can store media assets such as audio, video, still images, or the like, that can be played by portable computing device 250. Storage device 212 can also store other information such as a user's contacts (names, addresses, phone numbers, etc.); scheduled appointments and events; notes; and/or other personal information. In some embodiments, storage device 212 can store one or more application programs to be executed by processor 210 (e.g., video game programs, personal information management programs, media playback programs, etc.).

User interface 214 can include input devices such as a touch pad, touch screen, scroll wheel, click wheel, dial, button, switch, keypad, microphone, or the like, as well as output devices such as a video screen, indicator lights, speakers, headphone jacks, or the like, together with supporting electronics (e.g., digital-to-analog or analog-to-digital converters, signal processors, or the like). A user can operate input devices of user interface 214 to invoke the functionality of portable computing device 250 and can view and/or hear output from portable computing device 250 via output devices of user interface 214.

Processor 210, which can be implemented as one or more integrated circuits (e.g., a conventional microprocessor or microcontroller), can control the operation of portable computing device 250. In various embodiments of the present invention, processor 210 can execute a variety of programs in response to program code and can maintain multiple concurrently executing programs or processes. At any given time, some or all of the program code to be executed can be resident in processor 210 and/or in storage media, such as storage device 212.

Through suitable programming, processor 210 can provide various functionality for portable computing device 250. For example, in response to user input signals provided by user interface 214, processor 210 can operate a database engine to navigate a database of media assets stored in storage device 212 in response to user input and display lists of selected assets. Processor 210 can respond to user selection of an asset (or assets) to be played by transferring asset information to a playback engine also operated by processor 210, thus allowing media content to be played. Processor 210 can also operate other programs to control other functions of portable computing device 250. In some embodiments, processor 210 implements a protocol daemon and other programs to manage communication with one or more connected accessories (e.g., accessory 230), examples of which are described below.

Power manager 216 provides power management capability for portable computing device 250. For example, power manager 216 can deliver power from a battery (not explicitly shown) to accessory I/O interface 220 via line 217 and to other components of portable computing device 250 (power connections not shown). Power manager 216 can also receive power via accessory I/O interface 220 and line 219 and deliver received power to various components of portable computing device 250. Power received from accessory 230 can also be delivered to the battery, thereby allowing the battery to be recharged via accessory I/O interface 220. In some embodiments, power manager 216 can be implemented using programmable or controllable circuits operating in response to control signals generated by program code executing on processor 210 or as a separate microprocessor or microcontroller.

In some embodiments, power manager 216 is responsive to signals from a sensor (not explicitly shown) in accessory I/O interface 220. The sensor can generate a signal indicative of the type of accessory connected, and power manager 216 can use this information to determine, e.g., whether to distribute power from the battery or power received from accessory I/O interface 220. Power manager 216 can also provide other power management capabilities, such as regulating power consumption of other components of portable computing device 250 based on the source and amount of available power, monitoring stored power in the battery and generating user alerts if the stored power drops below a minimum level, and so on.

Network interface 218 can provide voice and/or data communication capability for portable computing device 250. In some embodiments of the present invention, network interface 218 can include radio frequency (RF) transceiver components for accessing wireless voice and/or data networks (e.g., using cellular telephone technology, advanced data network technology such as 3G or EDGE, WiFi (IEEE 802.11 family standards), or other mobile communication technologies, or any combination thereof), GPS receiver components, and/or other components. In some embodiments network interface 218 can provide wired network connectivity (e.g., Ethernet) in addition to, or instead of, a wireless interface. Network interface 218 can be implemented using a combination of hardware (e.g., antennas, modulators/demodulators, encoders/decoders, and other analog and/or digital signal processing circuits) and software components.

Accessory I/O interface 220 can allow portable computing device 250 to communicate with various accessories. For example, accessory I/O interface 220 can support connections to a computer, an external speaker dock or media playback station, a digital camera, a radio tuner (e.g., FM, AM and/or satellite), an in-vehicle entertainment system, an external video device, card reader, disc reader, or the like. In accordance with some embodiments of the invention, accessory I/O interface 220 can support connection to multiple accessories in a daisy chain configuration, allowing portable computing device 250 to manage concurrent communication with multiple accessories. This can be done, for example, by associating multiple virtual ports with a physical communication port provided by accessory I/O interface 220.

In some embodiments, accessory I/O interface 220 can include a connector, such as a 30-pin connector corresponding to the connector used on iPod® and iPhone® products, as well as supporting circuitry. The connector can provide connections for power and ground as well as for various wired communication interfaces, such as Universal Serial Bus (USB), FireWire (IEEE 1394 standard), and/or universal asynchronous receiver/transmitter (UART). The connector can also provide connections for audio and/or video signals, which may be transmitted to or from portable computing device 250 in analog and/or digital formats. Thus, accessory I/O interface 220 can support multiple communication channels, and a given accessory can use any or all of these channels.

Accessory 230 can include controller 240, user input device 242, audio/video output device 244, power manager 246, power supply 248 and PCD I/O interface 236. Accessories can vary widely in capability, complexity, and form factor. Various accessories may include components that are not shown, and may include, but are not limited to, storage devices (disk, flash memory, etc.) with fixed or removable storage media; camera components such as lenses, image sensors, and controls for same (e.g., aperture, zoom, exposure time, frame rate, etc.); microphones for recording audio (either alone or in connection with video recording); and so on.

Controller 240 can include a microprocessor or microcontroller executing program code to perform various operations associated with accessory 230. For example, where accessory 230 incorporates a sound and/or video system, program code executed by controller 240 can include programs for digital audio decoding, analog or digital audio processing, and the like. Where accessory 230 incorporates a digital camera, program code executed by controller 240 can include programs that allow a user to control the camera to adjust settings, capture images, display images, transfer image data to another electronic apparatus, etc.

User input device 242 may include user-operable controls such as a touch pad, touch screen, scroll wheel, click wheel, dial, button, switch, keyboard, keypad, microphone, or the like. A user can operate the various input controls of user interface 234 to invoke functionality of accessory 230, and such functionality may include exchanging control signals, data, or other communications with portable computing device 250, either directly or via an intermediary.

In some embodiments, accessory 230 can also provide output devices, such as audio/video output device 244. In some embodiments, audio/video output device 244 can include speakers and/or connection ports for connecting external speakers or headphones; a video screen and/or a connection port for connecting an external video screen, indicator lights, or the like, together with supporting electronics (e.g., digital-to-analog or analog-to-digital converters, signal processors or the like). These components can be coupled to receive audio and/or video signals via PCD I/O interface 250. Such components can allow the user to view and/or hear output from accessory 230.

Power manager 246 can provide power management capability for accessory 230. For example, power manager 246 can be configured to receive power from a power supply 248. In some embodiments, power supply 248 can include a connection to an external power source (e.g., the standard electric grid); for example, power supply 248 can include an AC-DC converter that can be internal or external to accessory 230. In other embodiments, power supply 248 can include a battery or other energy storage device. Power manager 246 can deliver power from power supply 248 to various components of accessory 230. In addition, in some embodiments, power manager 246 can deliver power to upstream accessories via PCD I/O interface 236.

PCD I/O interface 236 can allow accessory 230 to communicate with portable computing device 250, either directly or through an intermediary. In accordance with some embodiments of the invention, PCD I/O interface 236 can incorporate a USB interface. For example, PCD I/O interface 236 can provide a standard, mini, or micro USB port. In other embodiments, PCD I/O interface 236 can include a connector that can mate directly with a connector included in a portable computing device, such as a 30-pin connector that mates with the connector used on various iPod® products. Such a connector can be used to supply power to or receive power from portable computing device 250, to receive audio and/or video signals in analog and/or digital formats, and to communicate information via various interfaces, such as USB, UART, and/or FireWire.

Accessory 230 can be any electronic apparatus that interacts with portable computing device 250. In some embodiments, accessory 230 can provide remote control over operations of portable computing device 250, or a remote user interface that can include both input and output controls (e.g., a display screen). Accessory 230 can control various functions of portable computing device 250 and can also receive media content from portable computing device 250 and present such content to the user (e.g., through audio speakers and/or video display screen, depending on the type of media content). In other embodiments, portable computing device 250 can control operations of accessory 230, such as retrieving stored data from a storage medium of accessory 230, initiating an image capture operation by a camera incorporated into accessory 230, etc. As noted above, communication between accessory 230 and portable computing device 250 can be direct or through an intermediary source, and the presence or absence of an intermediary can be transparent to accessory 230.

It will be appreciated that the system configurations and components described herein are illustrative and that variations and modifications are possible. The portable computing devices and accessories may have other capabilities not specifically described herein. For example, they may incorporate mobile phone, global positioning system (GPS), broadband data communication, Internet connectivity, and the like.

Connectors at the various interfaces can be complementary or not as desired. Where two connectors are not complementary, an adapter can be provided to connect the two devices. While connectors may be described herein as having pins, a term generally associated with conventional electronic devices having wires to connect components, it is to be understood that other signal paths (e.g., optical signaling) can be substituted. Further, in some embodiments, some of the connections can be wireless, and connectors can be omitted where wireless interfaces are provided.

Further, while the portable computing devices and accessories are described herein with reference to particular blocks, it is to be understood that these blocks are defined for convenience of description and are not intended to imply a particular physical arrangement of component parts. Further, the blocks need not correspond to physically distinct components. Blocks can be configured to perform various operations, e.g., by programming a processor or providing appropriate control circuitry, and various blocks might or might not be reconfigurable depending on how the initial configuration is obtained. Embodiments of the present invention can be realized in a variety of apparatus including electronic devices implemented using any combination of circuitry and software.

Figure 3:
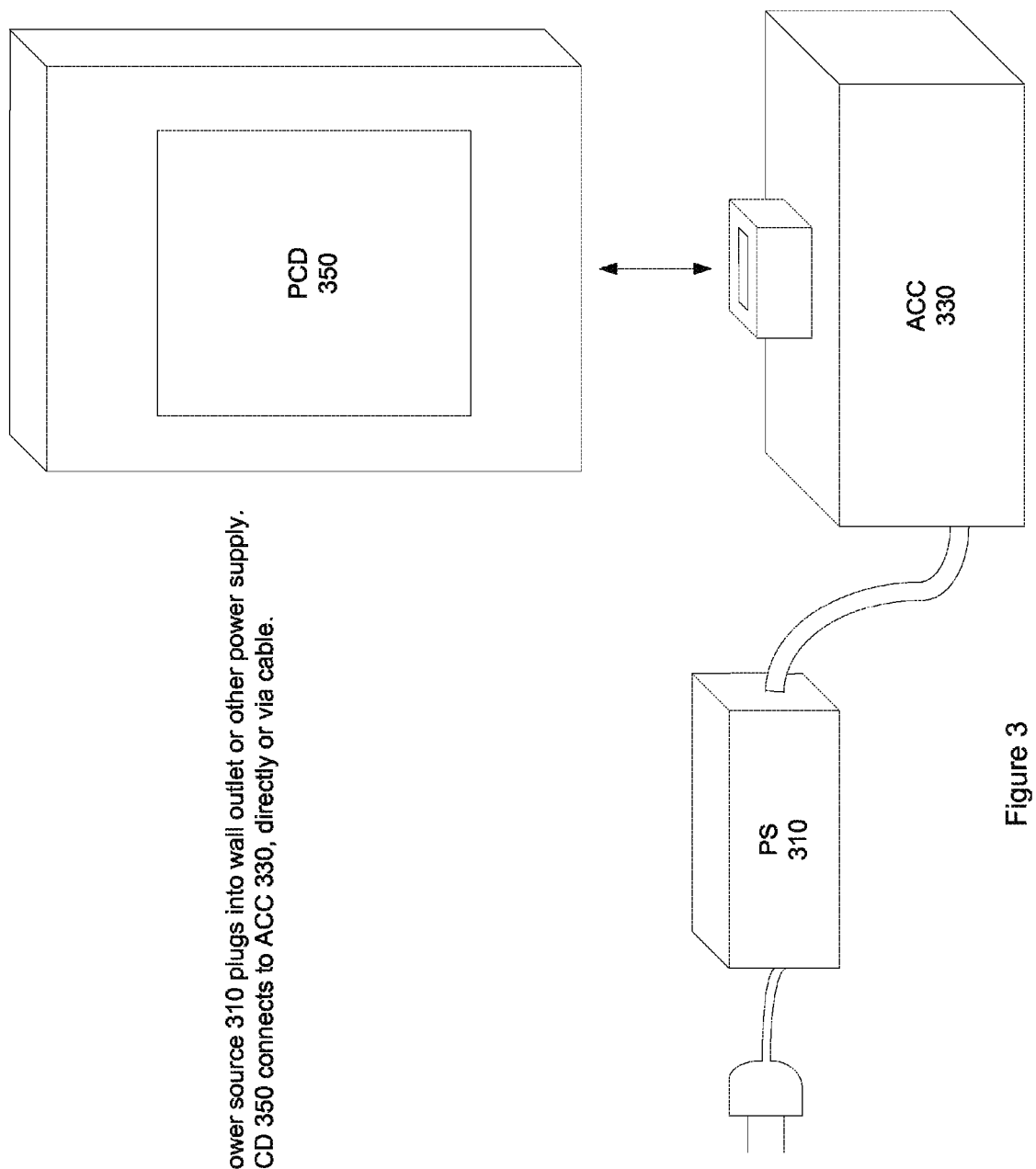
FIG. 3 illustrates an electronic system that is improved by the incorporation of embodiments of the present invention.

FIG. 3 illustrates an electronic system that is improved by the incorporation of an embodiment of the present invention. This figure includes power supply 310, accessory 330, and portable computing device 350. Power source 310 may couple to a wall outlet or other power supply, such as a car outlet. Power supply 310 may provide power to accessory 330. Portable computing device 350 may connect to accessory 330 either directly or via a cable or other electronic pathway.

Power provided by power supply 310 can be used to power accessory 330 and portable computing device 350. A battery (not shown) internal to portable computing device 350 may be charged using power from power source 310. It is desirable that the power provided by power source 310 be managed efficiently. Accordingly, embodiments of the present invention provide commands and supporting circuitry whereby portable computing device 350 may communicate with accessory 330 or other electronic device regarding the electronic system's power management.

In some embodiments, a portable computing device and an accessory can communicate while connected by exchanging commands and data according to a portable-computing-device-to-accessory-protocol, also referred to herein as an "accessory protocol." The commands and data can be communicated using any wired or wireless transport medium provided by the relevant interfaces.

The accessory protocol defines a format for messages to be exchanged between a portable computing device and any accessories connected thereto. For instance, the accessory protocol may specify that each message (also referred to herein as a command) is sent in a packet with a header and an optional payload. The header provides basic information (e.g., a start indicator, length of the packet, and a command code identifying a command to be processed by the recipient), while the payload provides any data associated with the command; the amount of associated data can be different for different commands, and some commands may provide for variable-length payloads. In some embodiments, the commands may be defined such that any particular command code is valid in only one direction. The packet can also include error-detection or error-correction codes as known in the art.

The accessory protocol can define a number of "lingoes," where a "lingo" is a group of related commands that can be supported (or unsupported) by various classes of accessories. In one embodiment, a command code can include a first byte identifying the lingo to which the command belongs and a second byte identifying the particular command within the lingo. Other command structures may also be used. It is not required that all accessories, or all portable computing devices to which an accessory can be connected, support every lingo defined within the accessory protocol.

In some embodiments, every accessory and every portable computing device that use the accessory protocol support at least a "general" lingo that includes commands common to the portable computing device and all accessories. The general lingo can include commands enabling the portable computing device and the accessory to identify and authenticate themselves to each other and to provide general information about their respective capabilities, including which (if any) other lingoes each supports. The general lingo can also include authentication commands that the portable computing device can use to verify the purported identity and capabilities of the accessory (or vice versa), and the accessory (or portable computing device) may be blocked from invoking certain (or all) commands or lingoes if the authentication is unsuccessful.

An accessory protocol can also include various other lingoes, such as a simple remote lingo that allows an accessory to send a command indicating a function of the portable computing device to be invoked; a remote user interface lingo that can be used to communicate commands and data related to replicating all or part of a user interface of a portable computing device on an accessory (thereby supporting a more advanced remote control), a tuner lingo that allows a user to control a tuner accessory by operating the portable computing device and/or to control a tuner in the portable computing device by operating an accessory, a storage lingo that allows an accessory to store data on the portable computing device, and so on. Any lingo or combination of lingoes or other commands or groups of commands can be used in connection with an accessory protocol.

In various embodiments of the present invention, these commands may be sent as packets. These packets may include information regarding power management activities. An example of such a packet is shown in the following figure.

FIG. 4 illustrates a packet format for conveying commands that may be employed by an embodiment of the present invention. This packet includes preamble or synchronizing information 410, which is followed by packet start field 420. A load length for the packet is identified in field 430. The lingo to which the command belongs is identified in field 440. The command itself is identified in field 450. The command data follows in field 460. A checksum or CRC may be performed using field 470.

The commands included in embodiments of the present invention are of two types, specifically, set and get commands. Set commands instruct a receiving device to set an internal value. Get commands request information from the receiving device. An example of activities in a system employing set commands is shown in the following figure.

Figure 5:
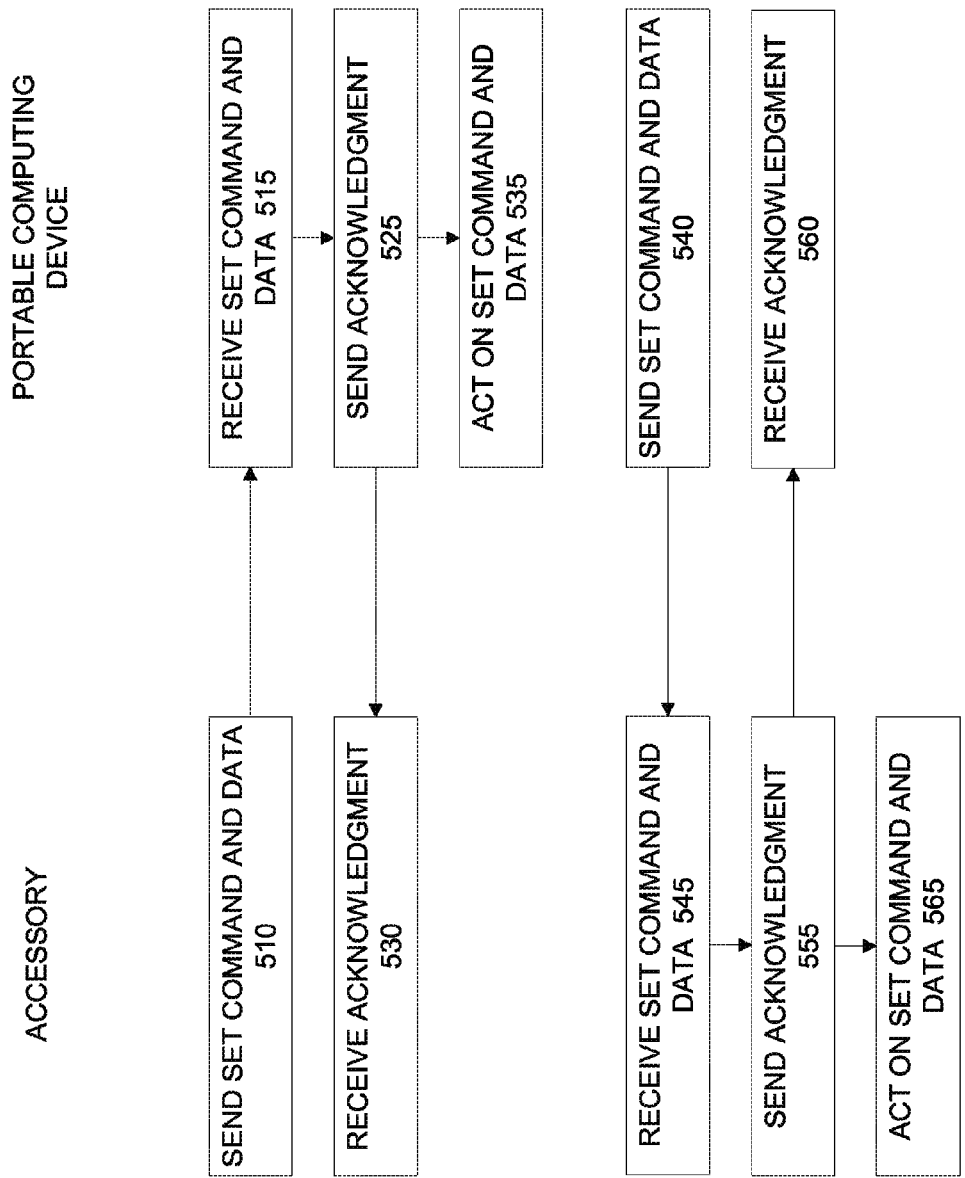
FIG. 5 illustrates the flow of commands and information between an accessory and portable computing device when utilizing set commands.

FIG. 5 illustrates the flow of commands and information between an accessory and portable computing device when utilizing set commands. In this example, acknowledgment signals that indicate that a command has been received are employed. Also in this example, set commands may travel from the accessory to a portable computing device, or from the portable computing device to an accessory.

In act 510, a set command and corresponding data may be sent by an accessory. In act 515, the set command and data may be received by a portable computing device. In act 525, an acknowledgement may be sent by the portable computing device, and received by the accessory in act 530. In act 535, a portable computing device may act on the set command and data.

In various embodiments of the present invention, an acknowledgement may be structured such that it identifies the received command that it is acknowledging. For example, the portable computing device may send an acknowledgment identifying that a specific command and data was received. In other embodiments of the present invention, the set command and data sent by the accessory in act 510 may have an identification number associated with it. In this case, the acknowledgment sent by the portable computing device in act 525 may include that identification number. The identification number may be tracked using a counter or other mechanism.

Again, in general, set commands may be initiated by either an accessory or a portable computing device. Accordingly, in act 540, a set command and data may be sent by the portable computing device. The set command and data may be received by an accessory in act 545. In act 555 an acknowledgement may be sent by the accessory and received by the portable computing device in act 560. In act 565, the accessory can act on the set command and data.

In various embodiments of the present invention, notifications may be used. A notification differs from the acknowledgment in that an acknowledgment indicates that a command and data has been received, whereas a notification indicates that the command and data have been acted on. In typical systems that are consistent with embodiments of the present invention, a portable computing device generates a large number of notifications. Accordingly, to reduce traffic between an accessory and the portable computing device, an accessory may register for notifications. That is, the accessory may request that it receives notifications of certain types of activities performed by a portable computing device. On the other hand, in typical systems, portable computing devices do not register for notifications from an accessory, since an accessory typically does not generate a large number of notifications. Accordingly, it is common for an accessory to provide all notifications to the portable computing device. Examples of this are shown on the following figure.

Figure 6:
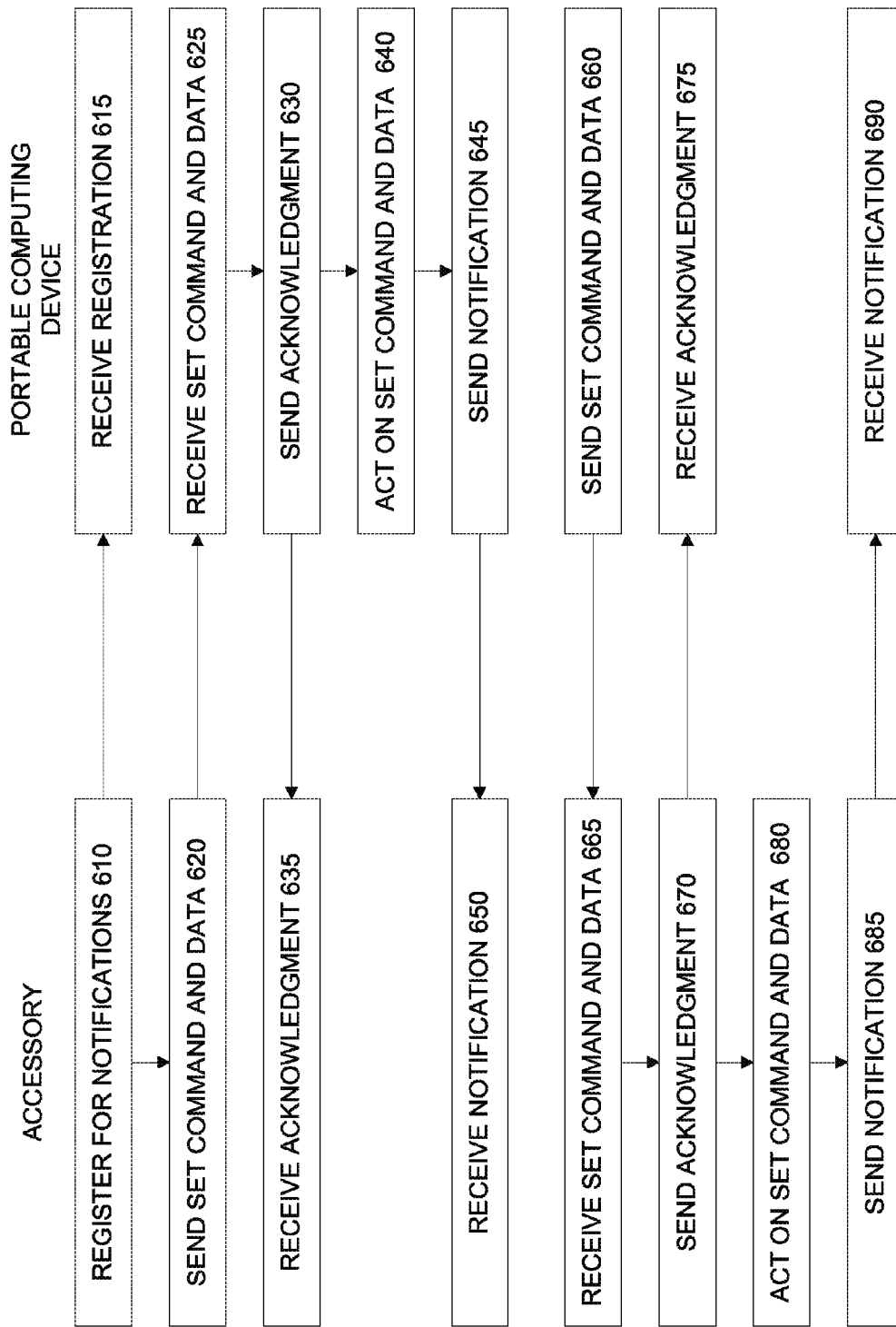
FIG. 6 illustrates command and data communication between an accessory and a portable computing device where both acknowledgments and notifications are employed.

FIG. 6 illustrates command and data communication between an accessory and a portable computing device where both acknowledgments and notifications are employed. In act 610, an accessory may register for notifications. This registration may be received in act 615 by a portable computing device. This registration may inform the portable computing device that the accessory would like notifications when the portable computing device performs certain classes or types of functions. In act 620, a set command and data may be sent from the accessory to the portable computing device. In act 625, the set command and data may be received by the portable computing device. An acknowledgement may be sent in act 630 by the portable computing device and received by the accessory in act 635. In act 640, the portable computing device acts on the set command and data. Once this activity is complete, a notification may be sent by the portable computing device in act 645. The notification may be received in act 650. At this time, the accessory may learn that the portable computing device has updated itself and will act in a manner consistent with the command and data sent in act 620.

Again, a portable computing device typically does not register for notifications with an accessory, though this may be performed in some embodiments of the present invention. In this example, the accessory may send notifications for each of the activities. In act 660, a set command and data may be sent from the portable computing device and received by the accessory in act 665. In act 670, an acknowledgment may be sent from the accessory and received by the portable computing device in act 675. In act 680, the accessory may act on the set command and data. Once this activity is complete, a notification may be sent in act 685 from the accessory and received in act 690 by the portable computing device.

In various situations, one device may ensure that another device is operating in a specific manner by instructing it to do so using a set command and data. On occasion, one device may need to retrieve information regarding a function parameter from the other device. In such a situation, the get command may be used. As with set commands, a get command may be initiated by either an accessory or a portable computing device. With these commands, acknowledgements or notifications are not needed, since the return of the requested information implies both the acknowledgement and notification functions. An example is shown in the following figure.

Figure 7:
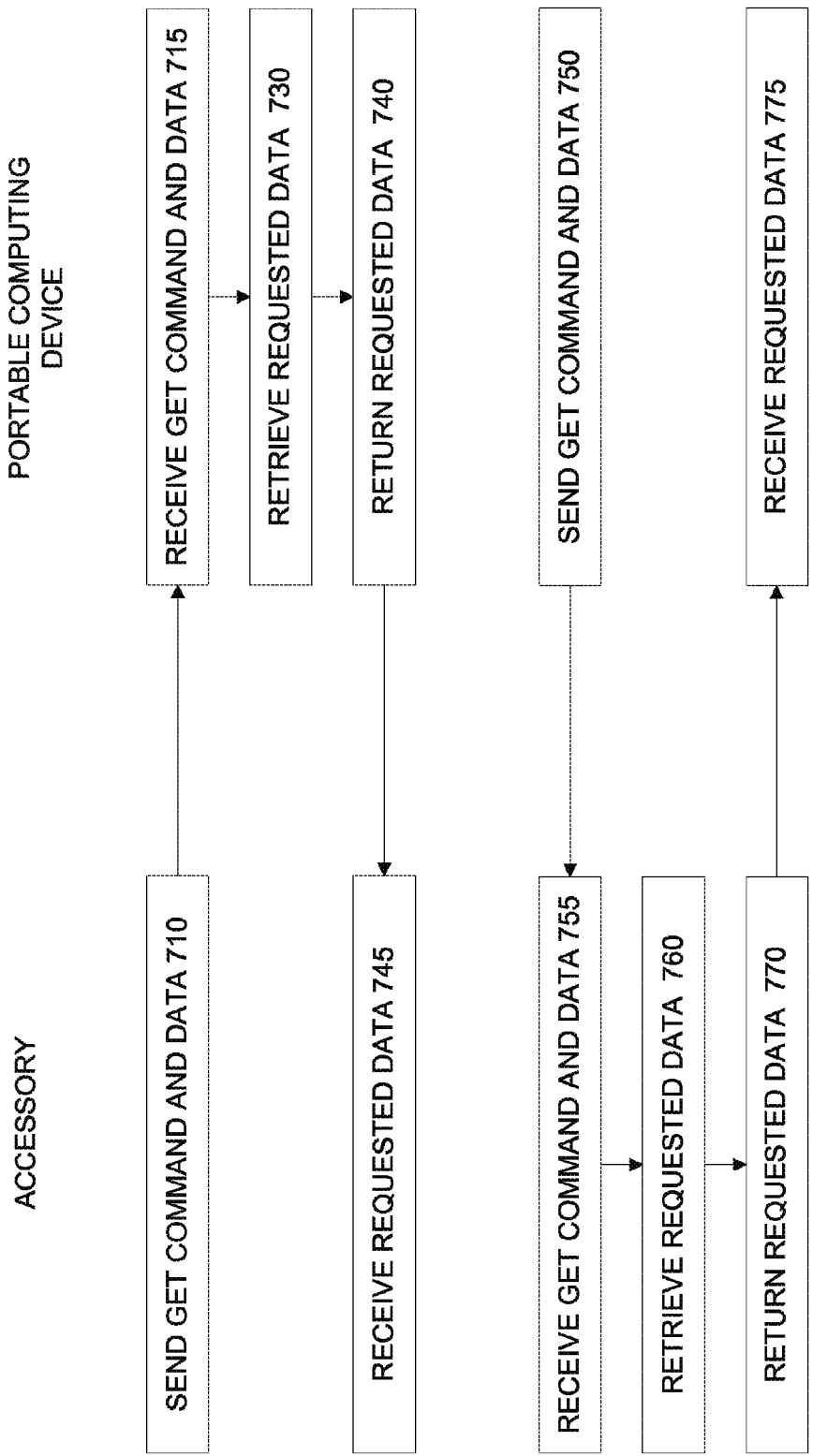
FIG. 7 illustrates the flow of get and return commands in an electronic system including an accessory and a portable computing device.

FIG. 7 illustrates the flow of get and return commands in an electronic system including an accessory and a portable computing device. In act 710, an accessory may send a get command to a portable computing device, which receives it in act 715. In act 730, the portable computing device may retrieve the requested data. Often, this may be as simple as reading a value from a register. In act 740, the portable computing device may return the requested data, which may be received by the accessory in act 745.

Again, either the accessory or portable computing device may initiate a get command. Accordingly, in act 750, a get command may be provided by portable computing device to an accessory. In act 755, the accessory may receive the get command and data and retrieve the requested data in act 760. After the data has been retrieved, the requested data may be returned by the accessory in act 770, and received by the portable computing device in act 775.

In various embodiments of the present invention, various commands may be used for specific functions, and these commands may be used in a specific direction. Some commands employed by various embodiments of the present invention, their typical direction, and their payloads, are listed in the following figure.

FIG. 8 is a table listing commands employed by various embodiments of the present invention to manage power between an accessory and a portable computing device. The typical direction of flow is also shown, as it is the command's typical payload. Each of these commands is further elaborated upon in the following figures.

Figure 9:
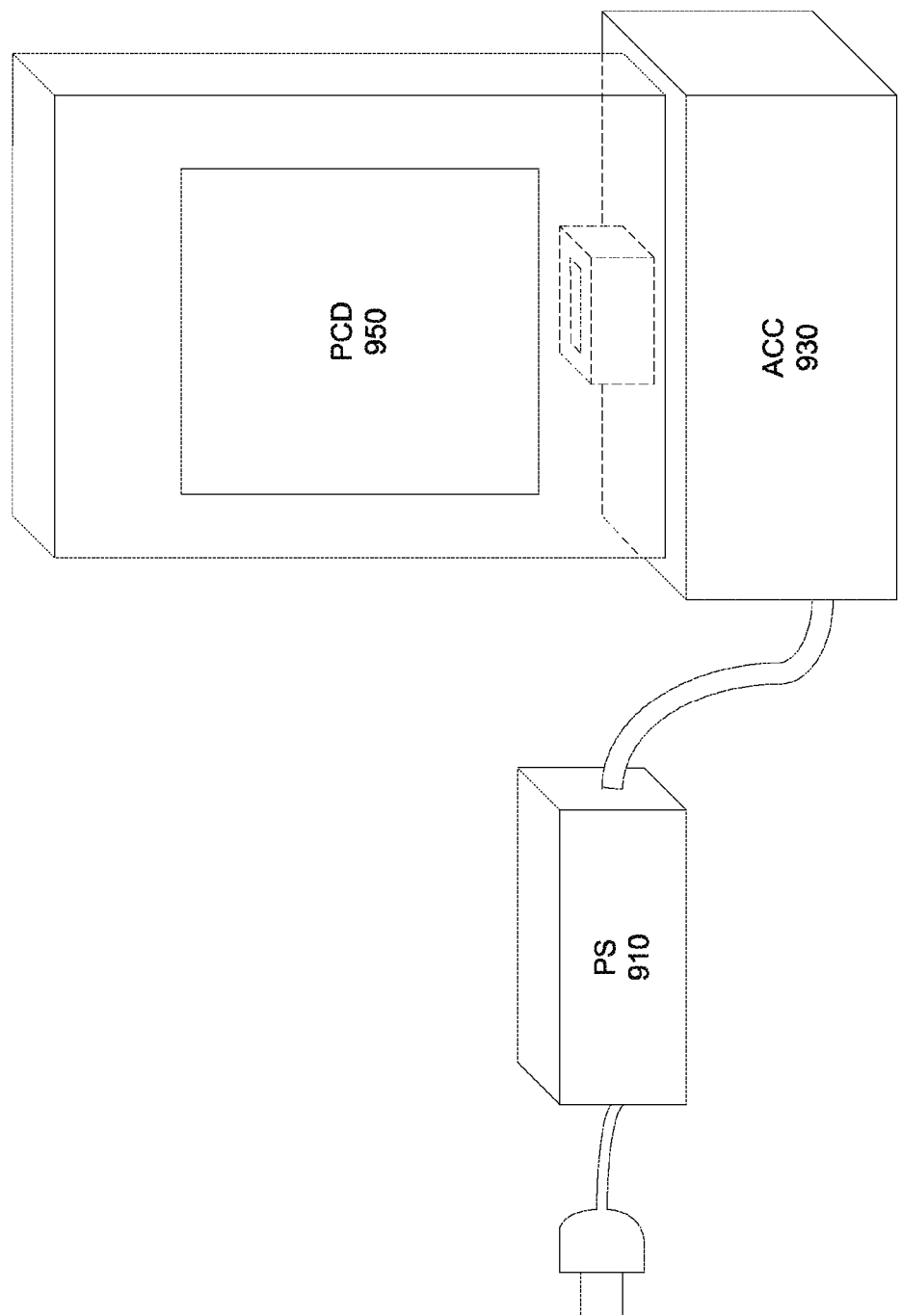
FIG. 9 illustrates an electronic system according to an embodiment of the present invention.

FIG. 9 illustrates an electronic system according to an embodiment of the present invention. This figure includes power source 910, accessory 930, and portable computing device 950. Power source 910 may provide power for both accessory 930 and portable computing device 950. In such a system, portable computing device 950 may wish to charge its internal battery at a high a rate as possible. Accordingly, portable computing device 950 would like to use any current not needed for operation of accessory 930.

Accessory 930 may determine the current capability of power source 910. In various embodiments of the present invention, this may be achieved by reading either voltage levels or resistor values on one or more pins or signal lines provided by power supply 910. In a specific embodiment of the present invention, power source 910 may provide power over a USB type connection, where voltage levels or values of resistors on the USB data lines indicate the current capability of power source 910. In other embodiments of the present invention, other types of identification, such as an identification resistor, may be used. For example, power source 910 may provide a signal or other indication as to its current capability. Accessory 930 can deduct the operating current that it requires from this available current. The net available current may be sent to portable computing device 950 using the SetAvailableCurrent command. This command may include the current limit that portable computing device 950 should use. That is, 1. Accessory 930 determines current capability of power source 910. 2. Accessory 930 deducts its operating current. 3. Accessory 930 sends SetAvailableCurrent command to portable computing device 950 to draw current having a limit of current capability of power source 910 less accessory operating current. The operations performed by accessory 930 and portable computing device 950 are shown in the following figure.

Figure 10:
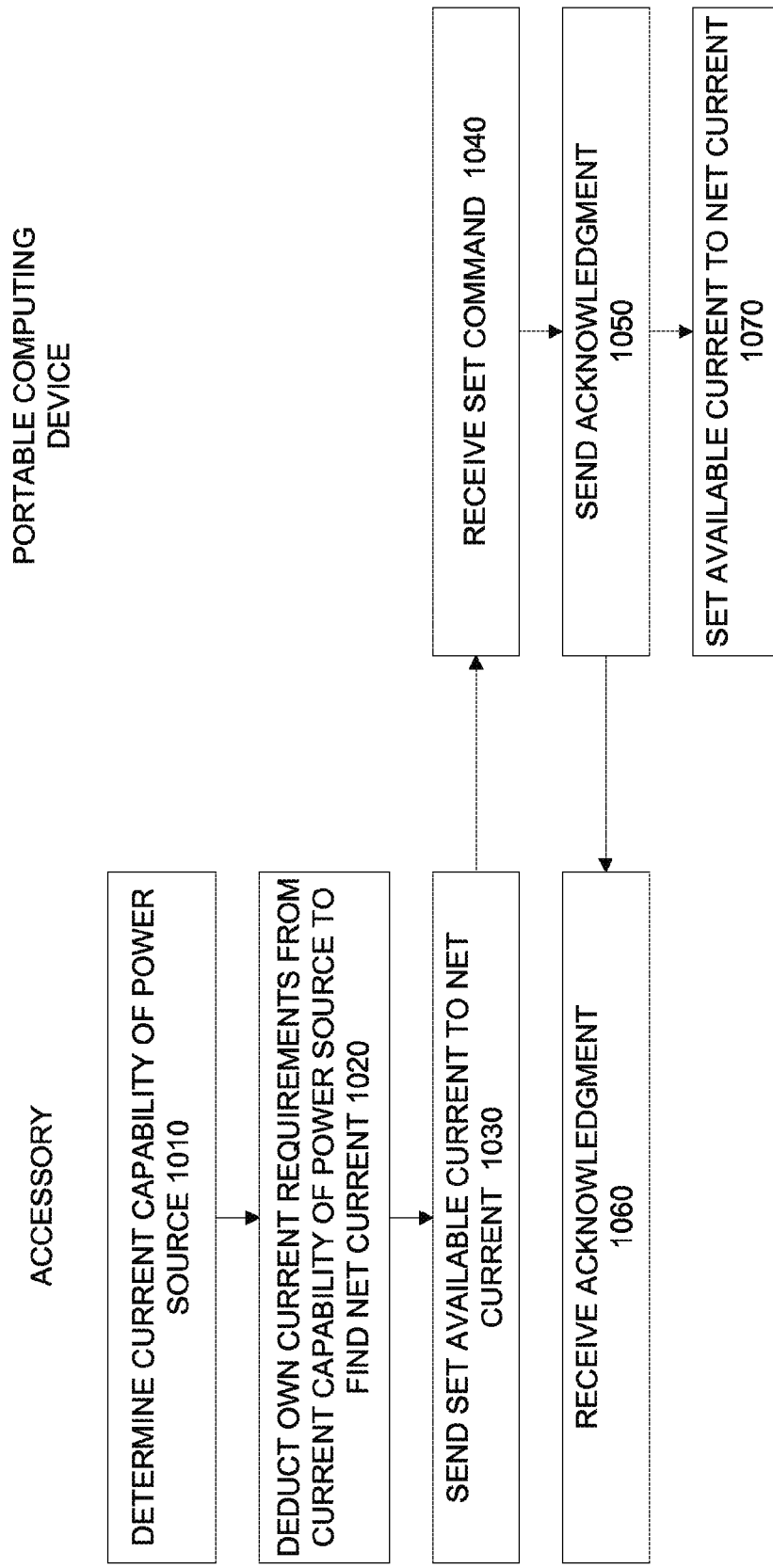
FIG. 10 illustrates the activities performed by an accessory and a portable computing device according to an embodiment of the present invention.

FIG. 10 illustrates the activities performed by an accessory and a portable computing device according to an embodiment of the present invention. In act 1010, the accessory may determine a current capability of a power source. In act 1020, the accessory may deduct its own current requirements from the current capability of the power source to determine a net current. In act 1030, this net current may be sent as part of a SetAvailableCurrent command to the portable computing device, which receives the set command in act 1040. In act 1050, an acknowledgment may be sent by the portable computing device and received by the accessory in act 1060. In act 1070, the portable computing device may set the available current level to the net current. After this, the portable computing device may draw a current not exceeding the net current provided by the accessory in act 1030. The portable computing device may provide a notification of this change to the accessory at this time.

Figure 11:
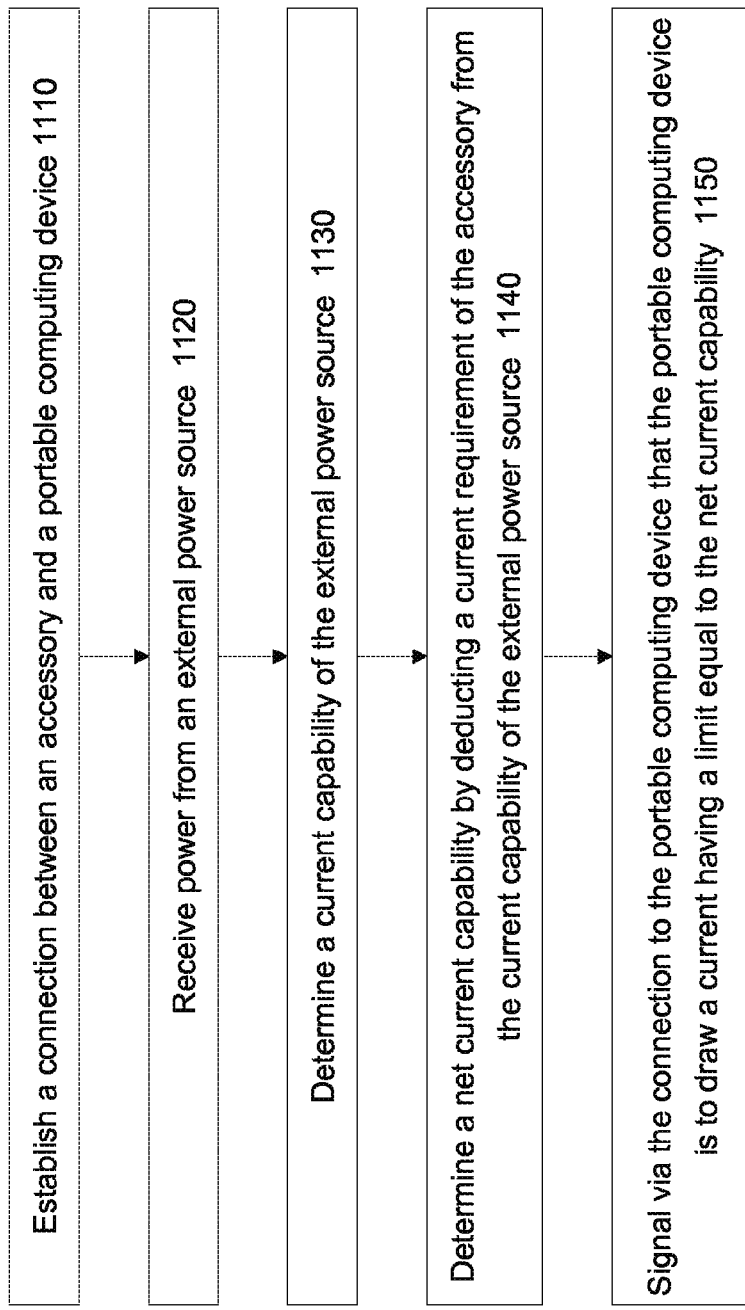
FIG. 11 illustrates a method of controlling a level of current drawn by a portable computing device according to an embodiment of the present invention.

FIG. 11 illustrates a method of controlling a level of current drawn by a portable computing device according to an embodiment of the present invention. In act 1110, a connection may be established between an accessory and a portable computing device. In act 1120, the accessory may receive power from an external power source. The accessory may determine a current capability of the external power source in act 1130. In act 1140, the accessory may determine a net current capability by deducting the required operating current from the current capability of the external power source. Again, this may ensure that the accessory has enough power to operate properly. In act 1150, the accessory may signal via the connection to the portable computing device that the portable computing device should draw a current having a limit equal to the net current capability.

In the above example, the accessory may determine the current capability of the power source. In other embodiments of the present invention, the portable computing device may determine the current capability of the power source. The portable computing device may achieve this by reading resistor values or voltage levels on lines provided by the power source. In a specific embodiment of the present invention, the accessory acts as a passthrough for these pins. This allows the portable computing device to read resistor values or voltage levels on these lines directly. In other embodiments of the present invention, the accessory may read these resistor values or voltage levels and pass the resistor values or voltage levels on to the portable computing device. An example is shown on the following figures.

Figure 12:
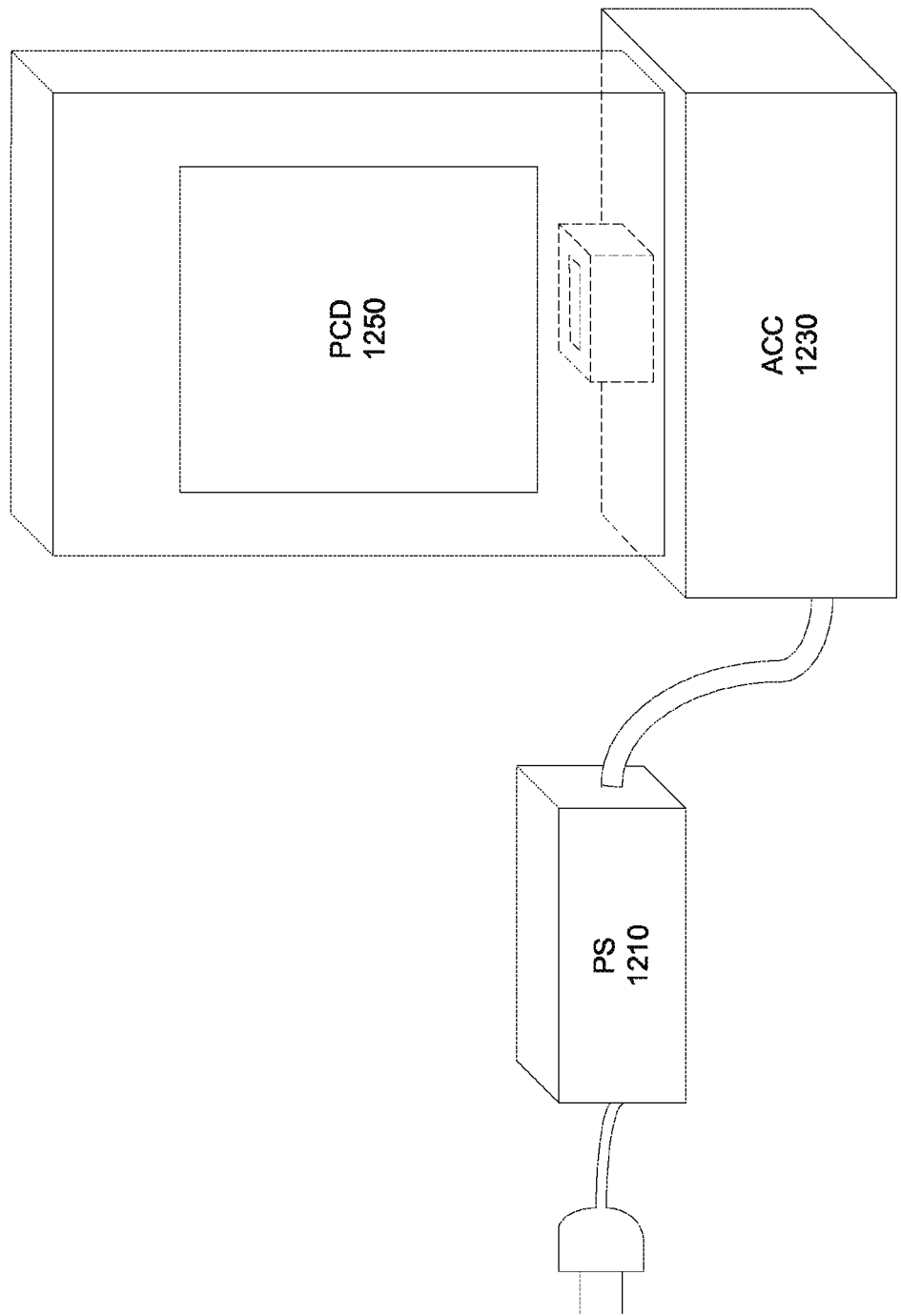
FIG. 12 illustrates an electronic system according to an embodiment of the present invention.

FIG. 12 illustrates an electronic system according to an embodiment of the present invention. In this system, portable computing device 1250 may determine the current capability of power source 1210. Accessory 1230 may communicate the operating current that it requires to portable computing device 1250 using the SetReserveCurrent command. This command may include in its payload the current that accessory 1230 requires for its operation. Portable computing device 1250 may then draw a current having a limit that is the current capability of power source 1210 less the operating current needed by accessory 1230. Again, this ensures that accessory 1230 has sufficient operating current and is not current-starved by portable computing device 1250. That is, 1. Portable computing device 1250 determines current capability of power source 1210. 2. Accessory 1230 communicates its operating current to portable computing device 1250 using SetReserveCurrent command. 3. Portable computing device draws current having a limit of current capability of power source 1210 less operating current of accessory 1230.

Figure 13:
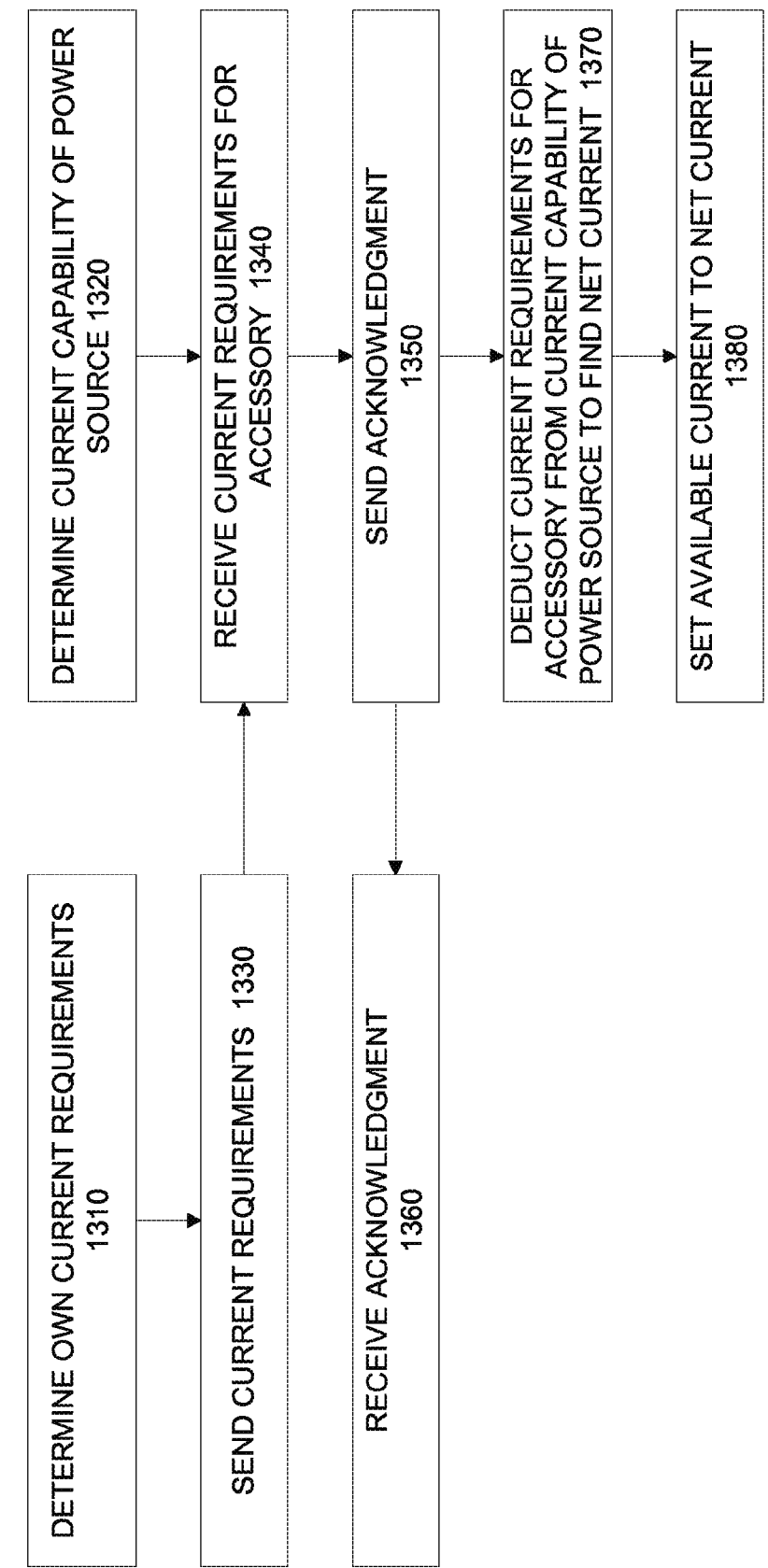
FIG. 13 illustrates the activities performed by an accessory and a portable computing device according to an embodiment of the present invention.

FIG. 13 illustrates the activities performed by an accessory and a portable computing device according to an embodiment of the present invention. In act 1310, an accessory may determine its current requirements. In act 1320, the portable computing device may determine the current capability of a power source. In act 1330, the accessory may send its current requirements to the portable computing device, which receives them in act 1340. An acknowledgment can be sent in act 1350, and received by the accessory in act 1360. In act 1370, the portable computing device may deduct current requirements of the accessory from the current capability of the power source to determine a net current. In act 1380, the portable computing device may set an available current to the net current. Following this, the portable computing device may draw a current having a limit equal to the net current determined in act 1370. A notification may be sent by the portable computing device to the accessory at this time.

Figure 14:
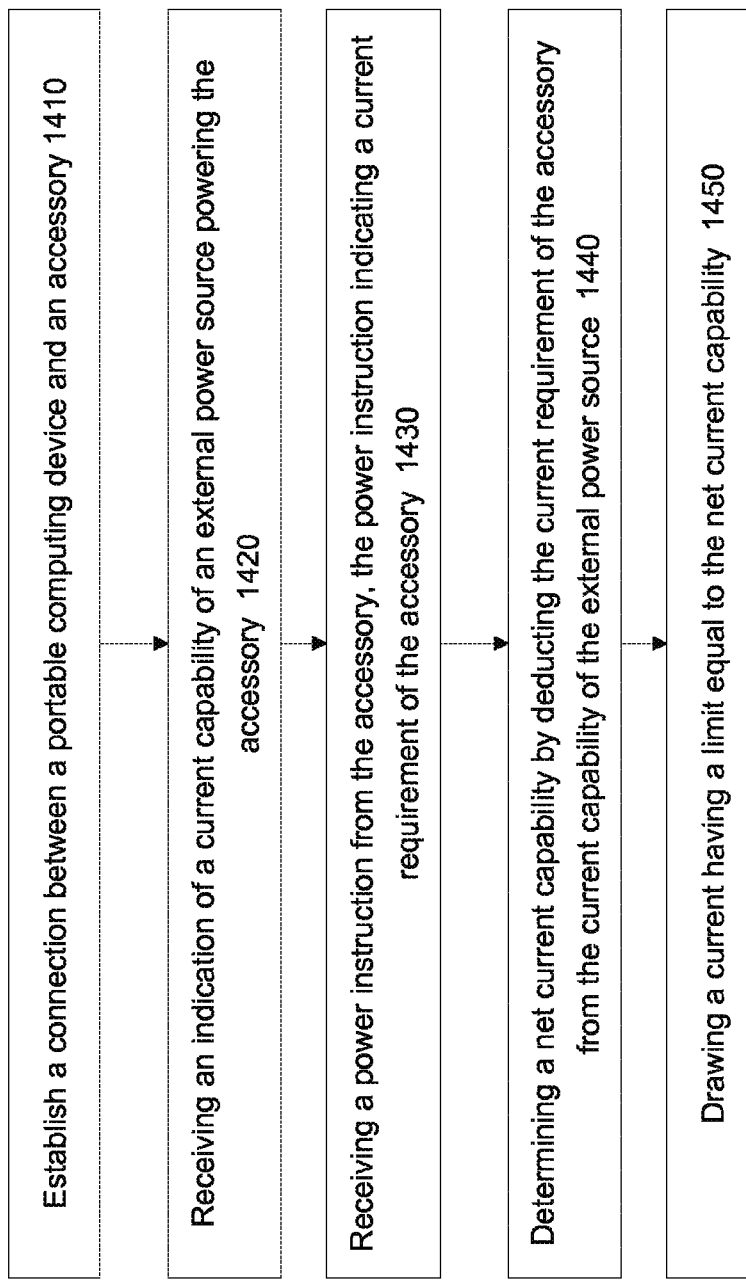
FIG. 14 is a flowchart illustrating the activities performed by an accessory and a portable computing device according to an embodiment of the present invention.

FIG. 14 is a flowchart illustrating the activities performed by an accessory and a portable computing device according to an embodiment of the present invention. In act 1410, a connection may be established between the portable computing device and the accessory. In act 1420, the portable computing device may receive an indication of a current capability of an external power source power from an accessory. The portable computing device may receive an instruction from the accessory indicating a current requirement for the accessory in act 1430. In act 1440, the portable computing device may determine a net current capability by deducting the current requirement of the accessory from the current capability of the external power source. In act 1450, the portable computing device may draw a current having a limit equal to the net current capability determined in act 1440.

In some systems, a power source may indicate that it can provide current at a first level. However, a cable used to connect a power source to an accessory or portable computing device may not be able to supply current at this first level, and may only be able to provide a current at a lower, second level. In such a situation, it is desirable that the cable be able to indicate that a portable computing device should only draw current at the lower, second level. Examples of how this is done are shown in the following figures.

Figure 15:
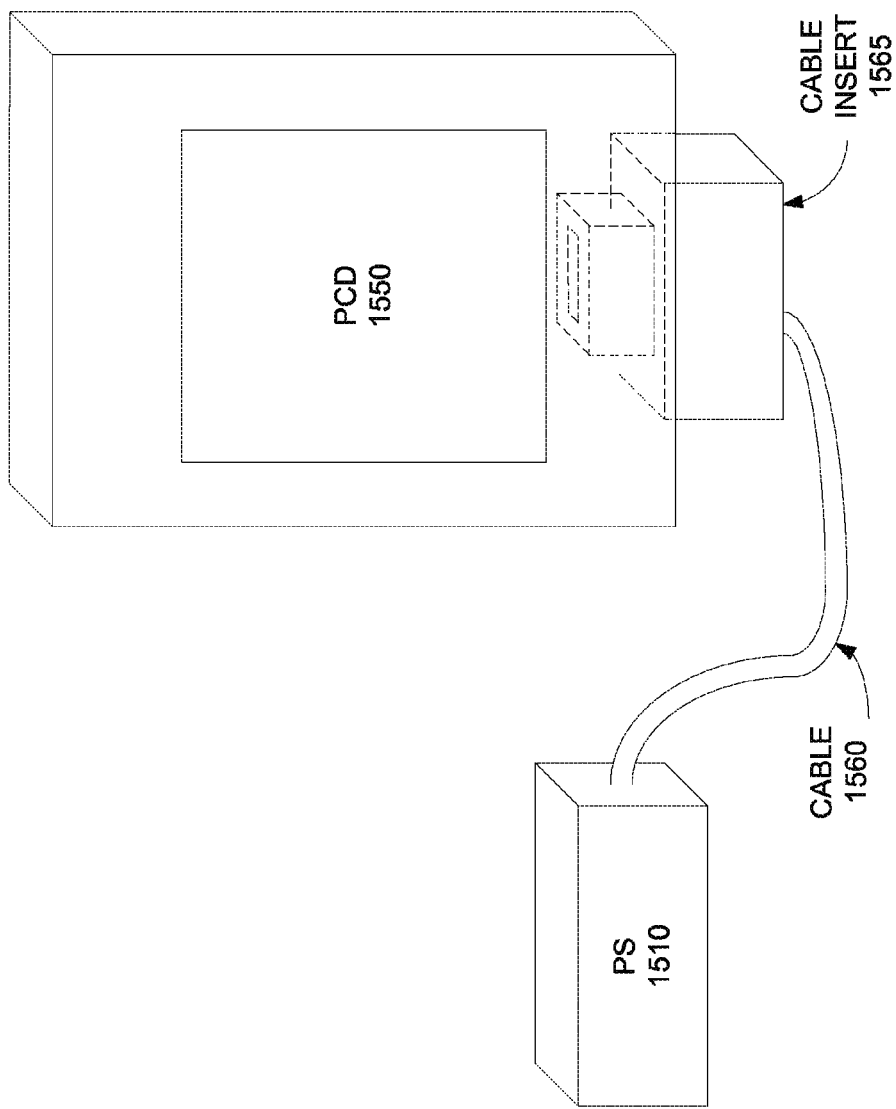
FIG. 15 illustrates an electronic system according to an embodiment of the present invention.

FIG. 15 illustrates an electronic system according to an embodiment of the present invention. In this example, power source 1510 may provide power to portable computing device 1550 via cable 1560 and cable insert 1565. Cable insert 1565 mates with a connector receptacle (not shown) on the portable device 1550.

Power source 1510 may provide an indication that it can supply current at a first level. Portable computing device 1550 may then read this indication that it can draw current at the first level. Cable 1560 then informs portable computing device 1550 that cable 1560 can provide current only at a lower second level. Cable 1560 may do this using the SetMaxCurrent command. Accordingly, portable computing device 1550 may draw current at the second, lower level, thereby protecting cable 1560. That is, 1. Power source 1510 provides indication that it can supply current at a first level. 2. Portable computing 1550 device reads indication that it can draw current at first level. 3. Cable 1560 informs portable computing device 1530 that cable 1560 can provide current only at a lower second level using SetMaxCurrent command. 4. Portable computing device 1550 draws current at the lower second level. A diagram illustrating these activities is shown in the following figure.

Figure 16:
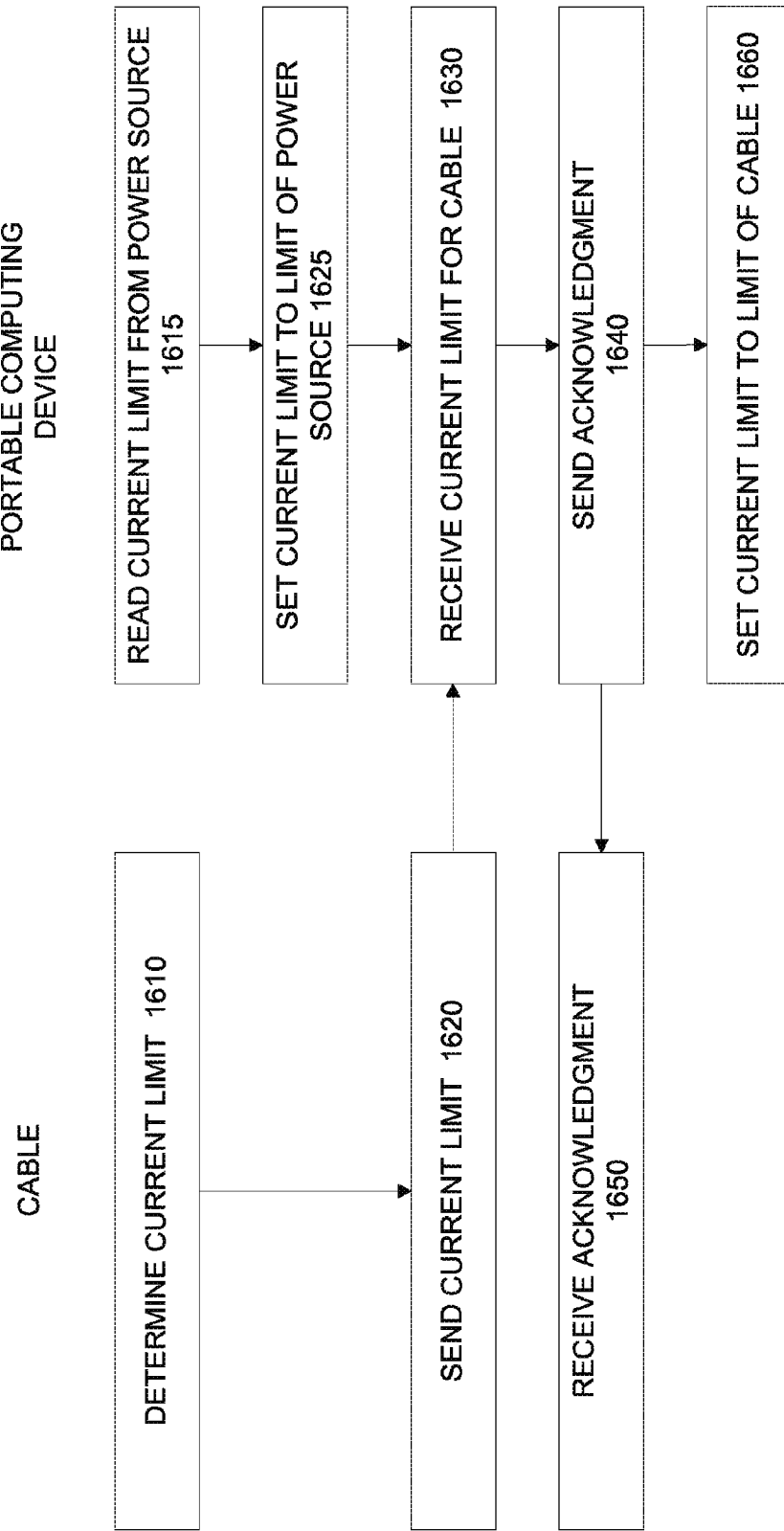
FIG. 16 illustrates the activities of a cable and a portable computing device according to an embodiment of the present invention.

FIG. 16 illustrates the activities of a cable and a portable computing device according to an embodiment of the present invention. In act 1610, the cable may determine its current limit. This current limit may be sent in act 1620 to the portable computing device. In act 1615, the portable computing device may determine a current limit for the power source. The portable computing device may set this as a current limit in act 1625. In act 1630, the portable computing device may receive the current limit for the cable. In act 1640 the portable computing device may send an acknowledgment, which is received by the cable in act 1650. In act 1660, the current limit for the portable computing device may be set to the lower current limit of the cable, thereby protecting the cable.

Figure 17:
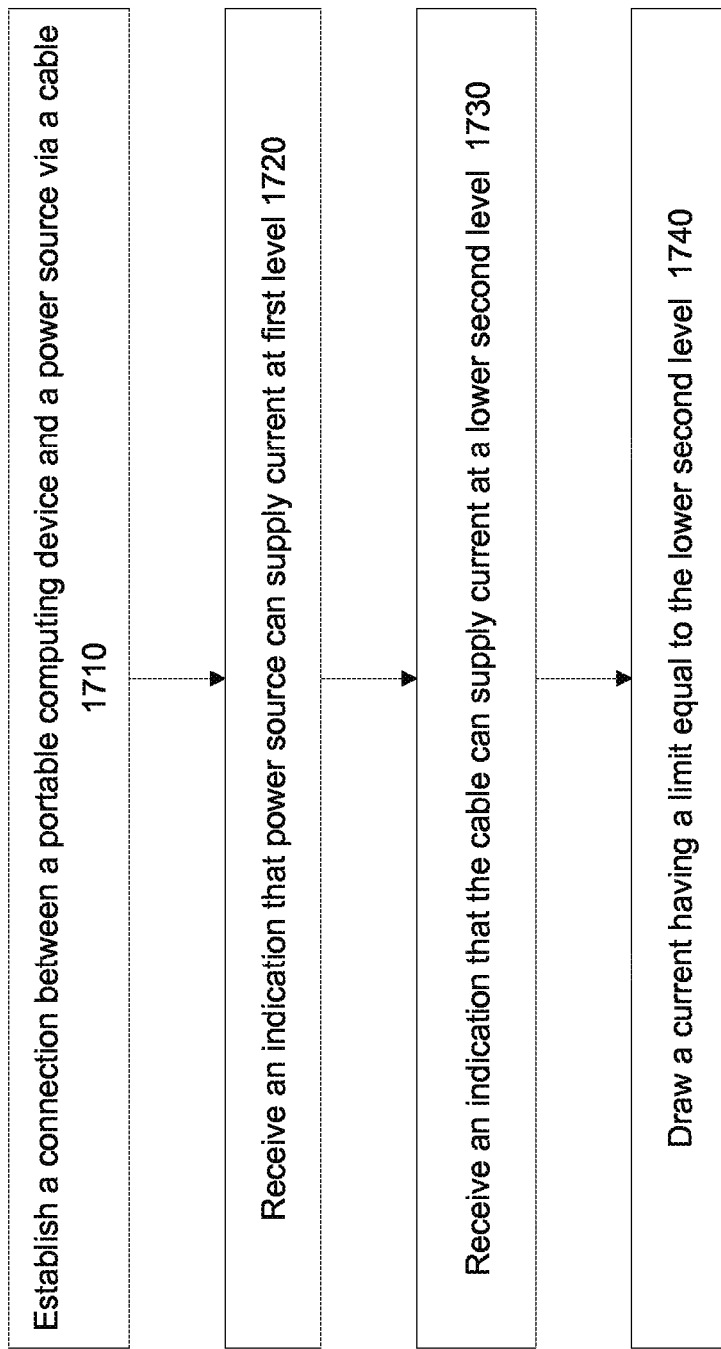
FIG. 17 is a flowchart illustrating the activities of a cable and a portable computing device according to an embodiment of the present invention.

FIG. 17 is a flowchart illustrating the activities of a cable and a portable computing device according to an embodiment of the present invention. In act 1710, a connection may be established between the portable computing device and a power source via the cable. In act 1720, the portable computing device may receive an indication that the power source can supply current at a first level. The portable computing device may receive an indication that the cable can only supply current at a lower, second level in act 1730. Accordingly, in act 1740, the portable computing device may draw a current having a limit equal to the lower second level.

In some embodiments of the present invention, a battery pack may be used to supply power to a portable computing device. In such a situation, it may be desirable that the power from the battery pack not be used to charge an internal battery of the portable computing device. By not having the portable computing device charge its internal battery, but merely operate using the current from a battery pack, the resulting power losses due to charge transfer from the battery pack to the internal battery are eliminated. An example is shown in the following figures.

Figure 18:
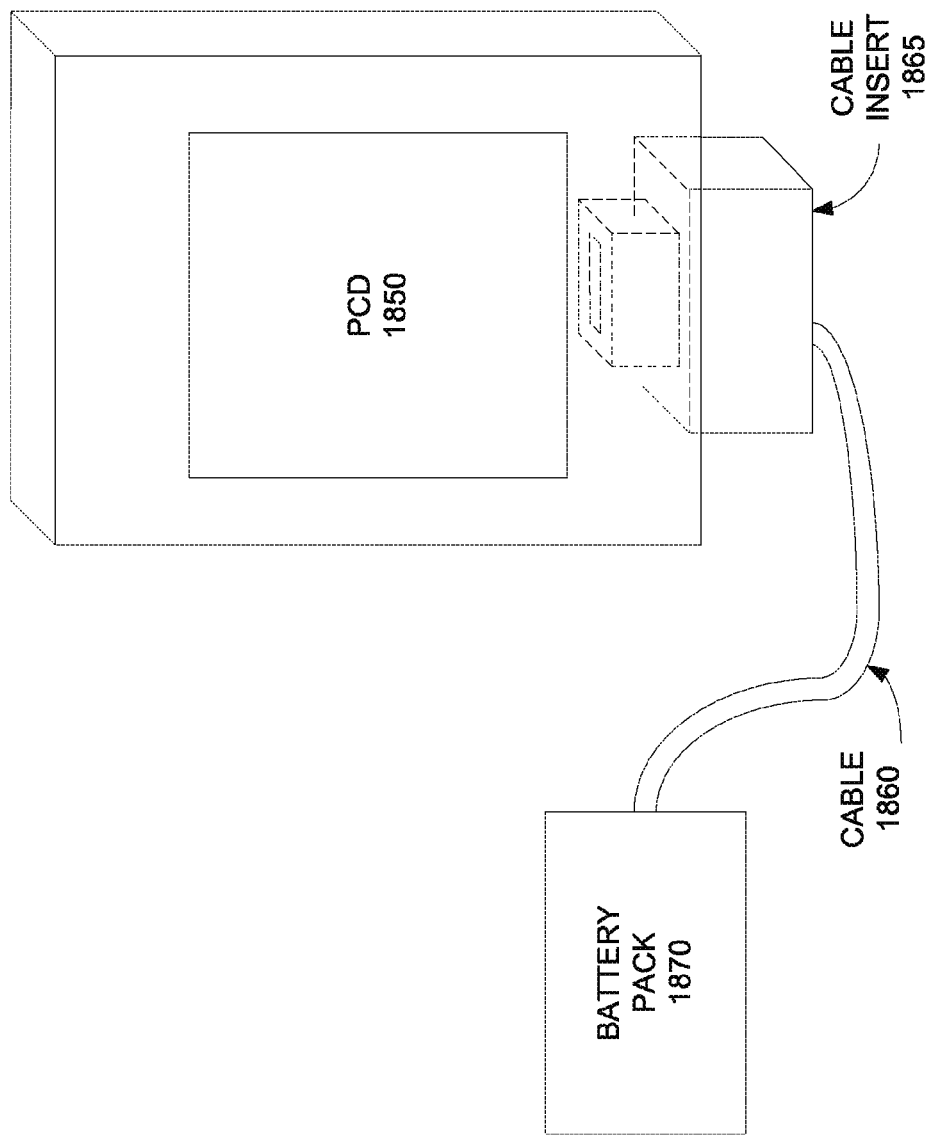
FIG. 18 illustrates an electronic system according to an embodiment of the present invention.

FIG. 18 illustrates an electronic system according to an embodiment of the present invention. In this example, battery pack 1870 may provide power to portable computing device 1850 via cable 1860 and cable insert 1865. In this example, battery pack 1870 may send a command to portable computing device 1850 to not charge the internal battery. Similarly, battery pack 1870 may send a command instructing the portable computing device 1850 to charge its internal battery. The battery pack may do this using the SetBatteryCharging command. The payload for this command may include a bit indicating whether portable computing device 1850 should charge its internal battery. After receiving a command to not charge its internal battery, portable computing device 1850 may draw a current sufficient to operate its circuitry, but portable computing device 1850 does not charge its internal battery. That is, 1. Battery pack 1870 sends command to portable computing device 1850 to not charge internal battery using SetBatteryCharging command. 2. Portable computing device 1850 draws current to operate circuitry, does not charge battery. Examples of the activities performed by the elements of this system are shown in the following figure.

Figure 19:
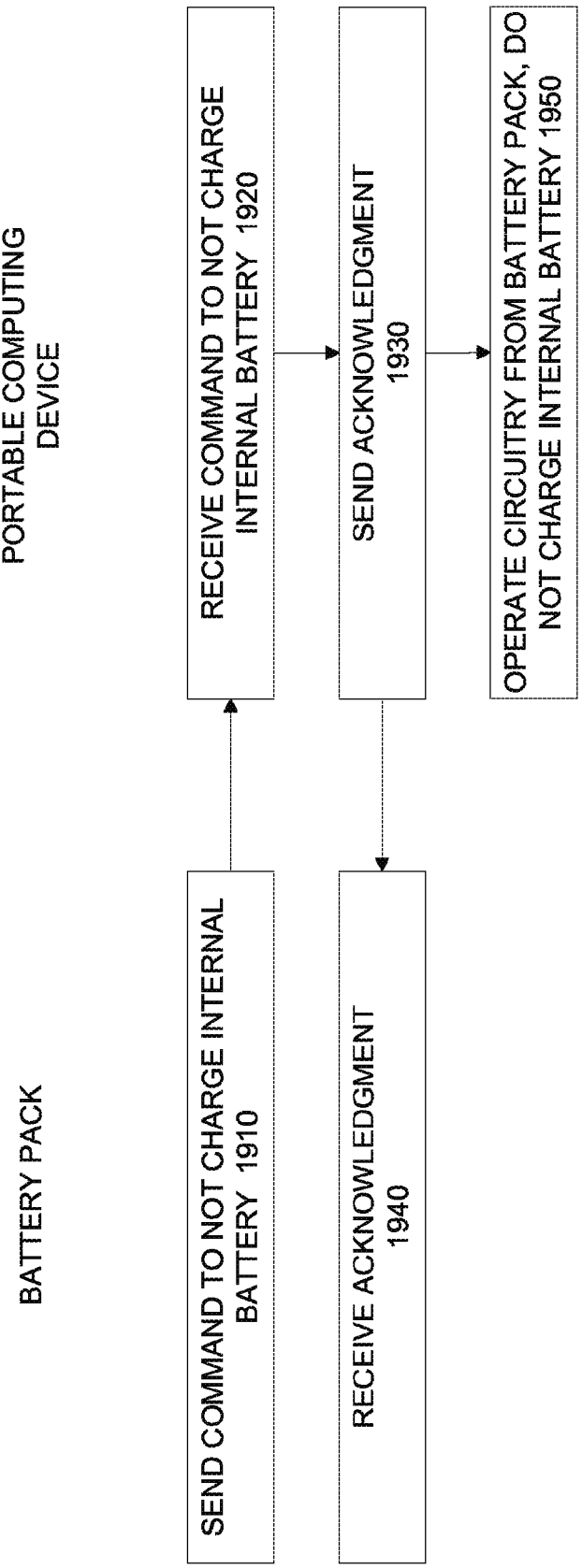
FIG. 19 illustrates the activities of a battery pack and a portable computing device according to an embodiment of the present invention.

FIG. 19 illustrates the activities of a battery pack and a portable computing device according to an embodiment of the present invention. In act 1910, a command to not charge an internal battery may be sent from the battery pack and received by the portable computing device in act 1920. An acknowledgement may be sent in act 1930, and may be received by the battery pack in act 1940. In act 1950, the portable computing device may operate its circuitry using power from the battery pack, but does not charge its internal battery. A notification of this change may be sent from the portable computing device to the battery pack.

Figure 20:
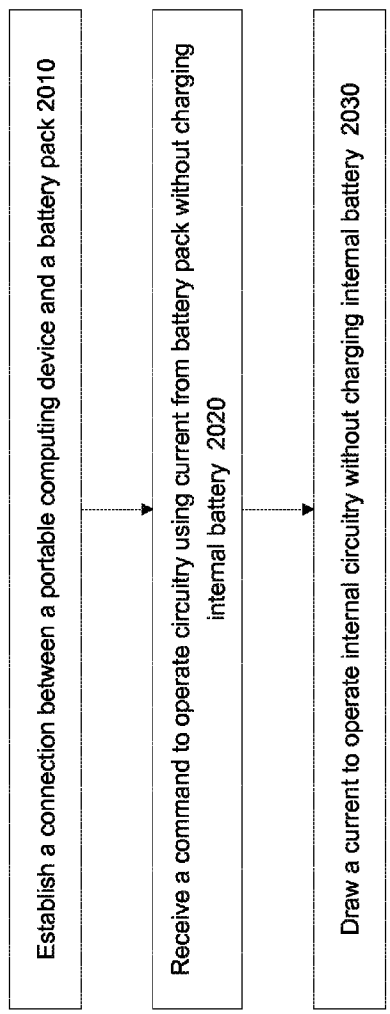
FIG. 20 illustrates a flowchart of the activities of a battery pack and a portable computing device according to an embodiment of the present invention.

FIG. 20 illustrates a flowchart of the activities of a battery pack and a portable computing device according to an embodiment of the present invention. In act 2010, a connection may be established between the portable computing device and the battery pack. In act 2020, the portable computing device may receive a command to operate its circuitry using current from the battery pack without charging its internal battery. Accordingly, the portable computing device may draw a current to operate its internal circuitry but does not charge its internal battery in act 2030.

In various embodiments of the present invention, an accessory and a portable computing device may share more than one power line. In a specific embodiment of the present invention, a USB power supply and an accessory power supply may be shared between an accessory and a portable computing device. In such a situation, an accessory may draw current from either supply. In this arrangement, power may be supplied by a power source over the USB lines. The portable computing device may prefer that the accessory take its power requirements from the USB power supply, thereby leaving the remaining USB power for the portable computing device. Alternately, the portable computing device may prefer to receive all the available power from the USB line and return power to the accessory using the accessory power supply.

Reasons for this include improved flexibility regarding the amount of current that the portable computing device can draw. For example, in a specific embodiment of the present invention, a power source may provide, for example, 2.0 amps of current. An accessory may require 0.2 amps of current for its operation. In a particular embodiment of the present invention, the accessory can instruct the portable computing device to draw either 1.0 or 2.0 amps of current. Since 1.8 amps is available to the portable computing device, the accessory instructs the portable computing device to draw 1.0 amps. Accordingly, an internal battery of the portable computing device cannot charge as fast as it would if it could receive the entire 1.8 amps. Thus, the portable computing device may wish to draw the draw 2.0 amps available on the USB supply, and return 0.2 amps to the accessory using the accessory supply line. This arrangement leaves a net 1.8 amps for the operation of the portable computing device and for charging its internal battery. Examples of this are shown in the following figures.

Figure 21:
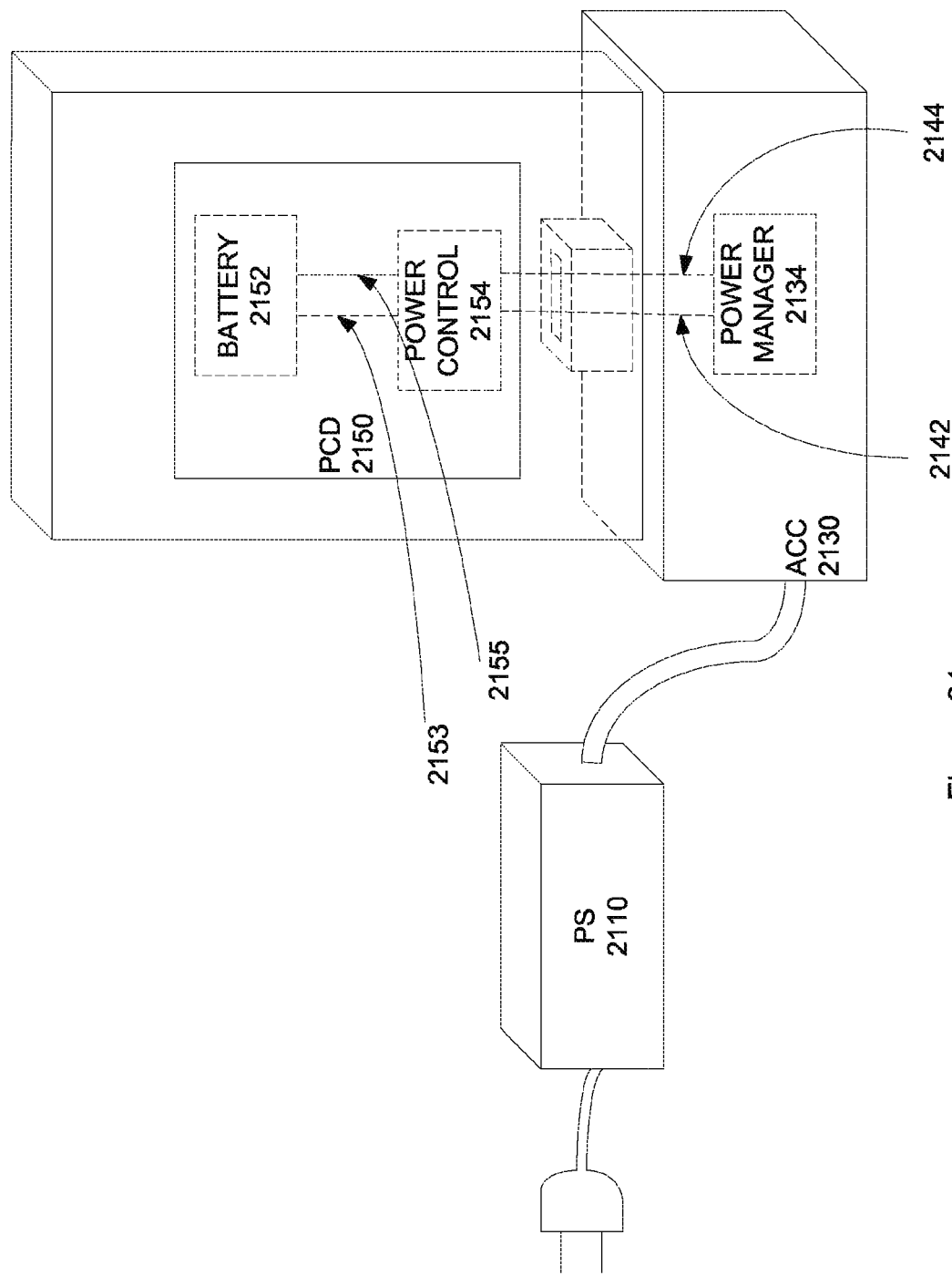
FIG. 21 illustrates an electronic system according to an embodiment of the present invention.

FIG. 21 illustrates an electronic system according to embodiment of the present invention. Power source 2110 may provide current to accessory 2130 and portable computing device 2150. Portable computing device 2150 and accessory 2130 may share first and second power lines 2142 and 2144. Accessory 2130 may send a command to portable computing device 2150 asking which power line it should use. Accessory 2130 may do this using the GetPrefPower command. This command may include in its payload a current needed if the first power line is used and a current that may be needed if a second power line is used. Portable computing device 1250 may then instruct accessory 1230 to use the first or the second power line 2142 and 2144, using the RetPerfPower command. This command identifies the power source to use in its payload.

Specifically, first power line 2142 may convey a USB power supply. This power supply may be derived from power source 2110 by power manager 2134 in accessory 2130. Power manager 2134 may provide this power on power line 2142 to power control 2154 in portable computing device 2150. Power control 2154 may charge battery 2152 in portable computing device 2150 over line 2153 using this power and provide current for the operation of other circuitry. Battery 2152 may return power on line 2155 to power control 2154. Power control 2154 may provide this battery power as an accessory power on second power line 2144 to power manager 2134. With this configuration, accessory 2130 may be powered directly from the USB power on first power line 2142, or it may receive power via battery 2152 on second power line 2144. That is, 1. Portable computing device 2150 and accessory 2130 share first and second power lines 2142 and 2144. 2. Accessory 2130 sends get command to portable computing device 2150 asking which power line it should use using GetPrefPower command. 3. Command may include current needed if first power line 2142 used, and current needed if second power line 2144 used. 4. Portable computing device 2150 instructs accessory 2130 as to which power line it should use using RetPrefPower command. The activities performed by the devices in this figure are shown in the following figure.

Figure 22:
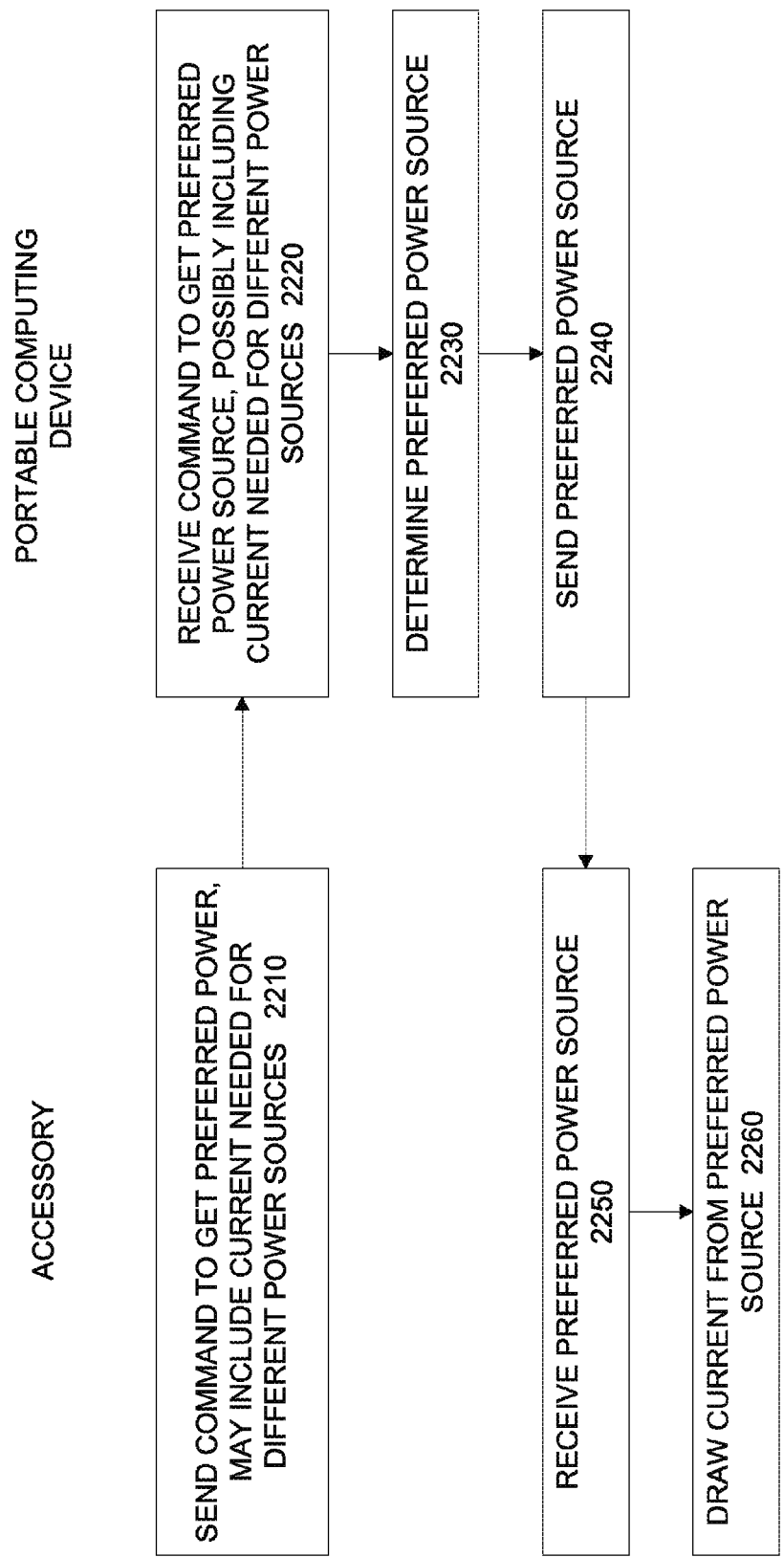
FIG. 22 illustrates the activities performed by an accessory and portable computing device according to an embodiment of the present invention.

FIG. 22 illustrates the activities performed by an accessory and portable computing device according to an embodiment of the present invention. In act 2210, an accessory may send a command to get preferred power, that is, whether the accessory should operate by drawing current from a first or second power source. This command may be received by the portable computing device in act 2220. In act 2230, the portable computing device may determine the preferred power source and send this information to the accessory in act 2240. In act 2250, the accessory may receive the preferred power source and draws current from that source in act 2260.

Figure 23:
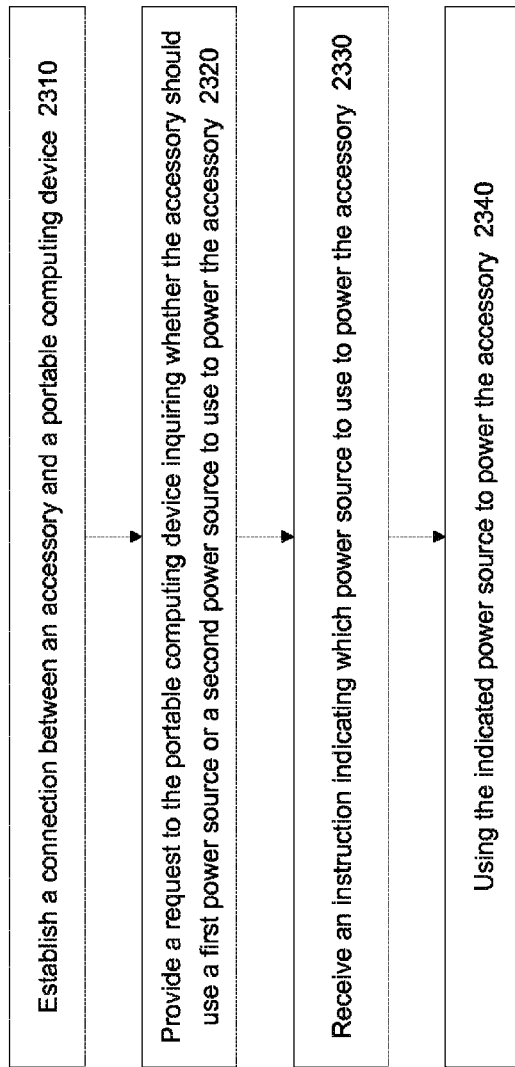
FIG. 23 is a flowchart illustrating the activities performed an accessory and a portable computing device according to an embodiment of the present invention.

FIG. 23 is a flowchart illustrating the activities performed by an accessory and portable computing device according to an embodiment of the present invention. In act 2310, a connection may be established between the accessory and the portable computing device. In act 2320, the accessory may provide a request to the portable computing device inquiring whether they accessory should use a first power source or a second power source to power the accessory. In act 2330, the accessory may receive an instruction indicating which power source to use to power the accessory. In act 2340, the accessory may use the indicated power source to power the accessory.

In various embodiments of the present invention, it is desirable for an accessory to read information regarding charging and power management from a portable computing device. One such parameter may include the maximum charging current that the portable computing device can provide. This information may be requested and returned using the GetUltraHighPower and RetUltraHighPower commands. Examples of this are shown in the following figures.

Figure 24:
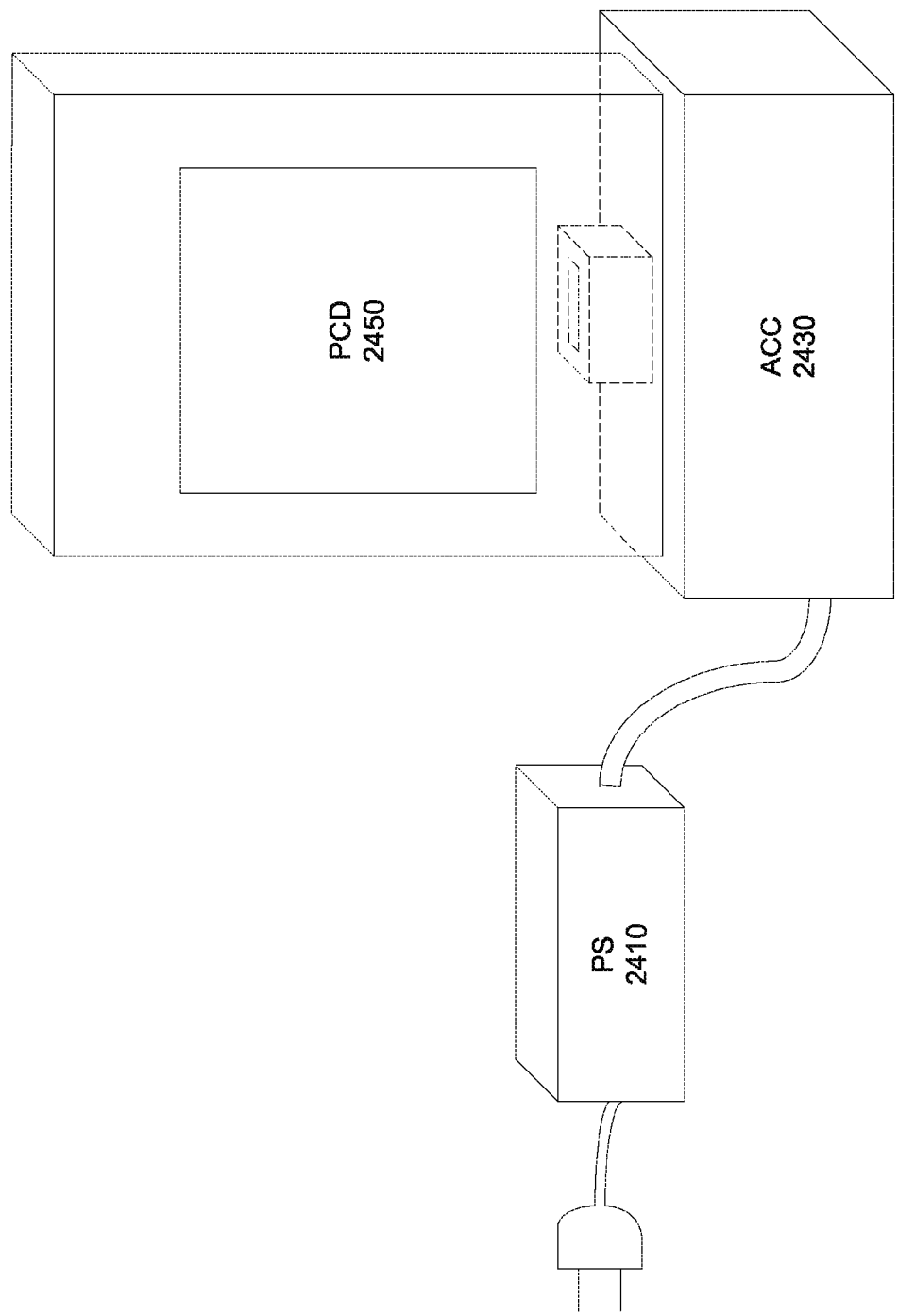
FIG. 24 illustrates an electronic system according to an embodiment of the present invention.

FIG. 24 illustrates an electronic system according to an embodiment of the present invention. This figure includes power source 2410, accessory 2430, and portable computing device 2450. Accessory 2430 may send a command to portable computing device 2450 to retrieve charging information using the GetChargingInfo command. Portable computing device 2450 may return charging information to accessory 2430 using the RetChargingInfo command. That is, 1. Accessory 2430 sends get command to portable computing device 2450 to retrieve charging information using GetChargingInfo or GetUltraHighPower commands. 2. Portable computing device 2450 returns charging information to accessory 2430 using RetChargingInfo or RetUltraHighPower commands. These activities are shown in the following figure.

Figure 25:
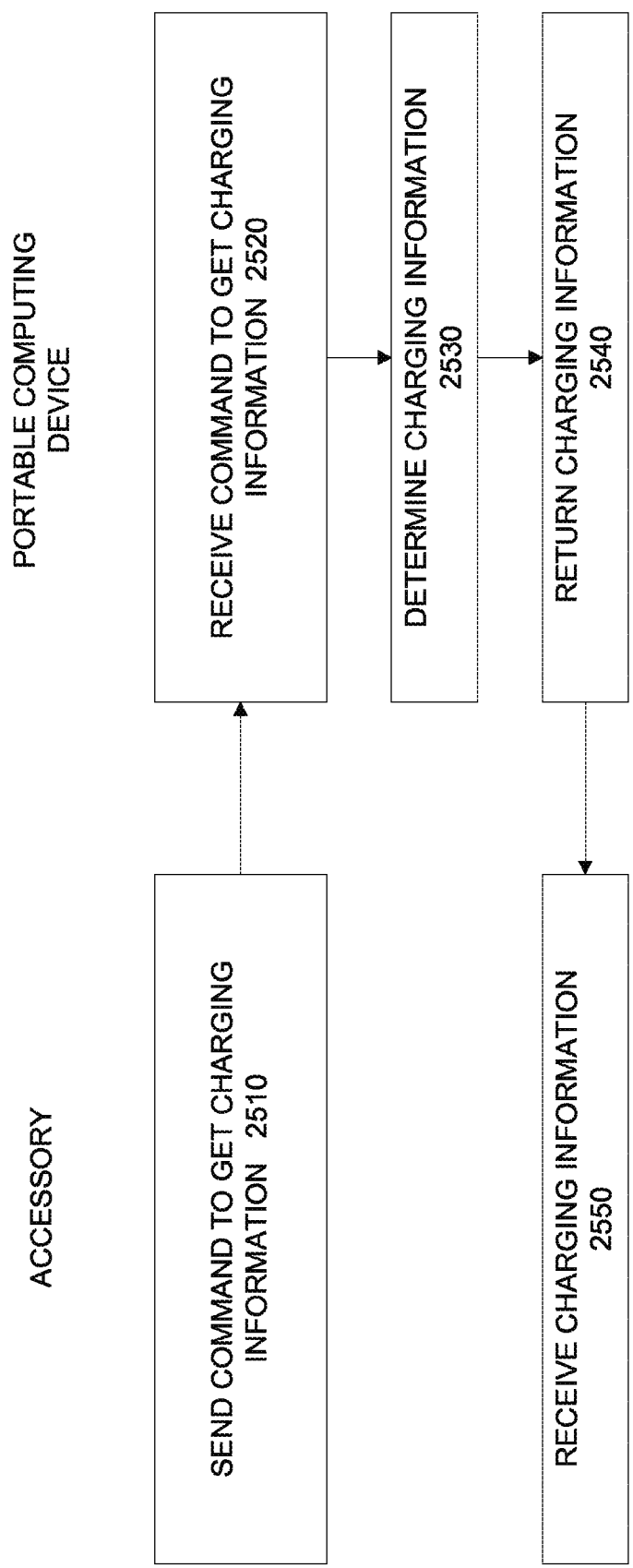
FIG. 25 illustrates activities performed by an accessory and a portable computing device according to an embodiment of the present invention.

FIG. 25 illustrates activities performed by an accessory and a portable computing device according to an embodiment of the present invention. In act 2510, an accessory may send a command to get charging information. The command to get information may be received by the portable computing device in act 2520. This information may then be read, for example from a register, in act 2530. In act 2540, the charging information may be returned and received by the accessory in act 2550. This charging information may include charging information discussed above, such as available current limits, maximum current limits, the status of internal battery charging, and other parameters.

Figure 26:
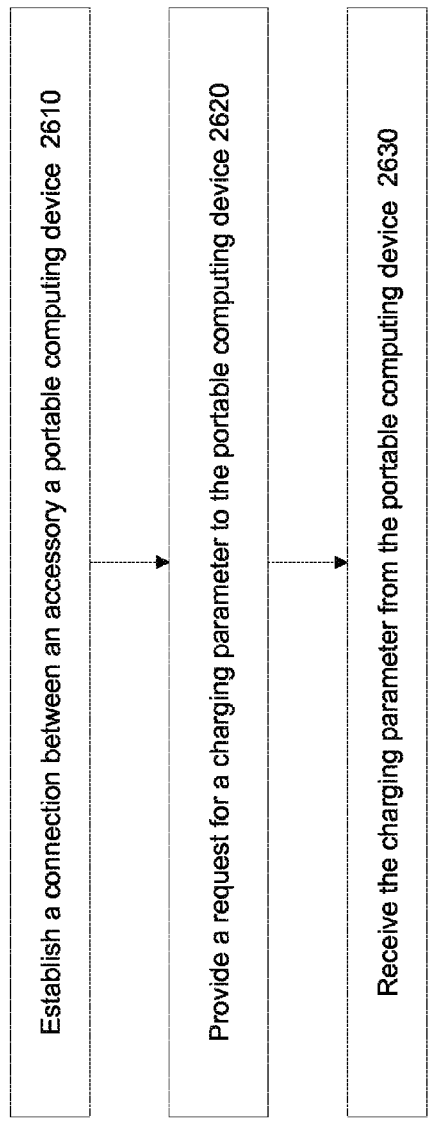
FIG. 26 illustrates a flowchart of the activities performed by an accessory and a portable computing device according to an embodiment of the present invention.

FIG. 26 illustrates a flowchart of the activities performed by an accessory and a portable computing device according to an embodiment of the present invention. In act 2610, a connection may be established between the accessory and the portable computing device. A request for charging information may be sent to the portable computing device in act 2620. In act 2630, the charging information may be received from the portable computing device.

In some embodiments of the present invention, a portable computing device may identify an accessory by using a resistor value on the accessory. For example, the accessory may include a resistor having a specified value between two or more of its pins that may be used to communicate with the portable computing device. From this identification, one or more default values may be set in the portable computing device. On occasion, it may be desirable to override or supplement these values with specified values. Examples of this are shown in the following figures.

Figure 27:
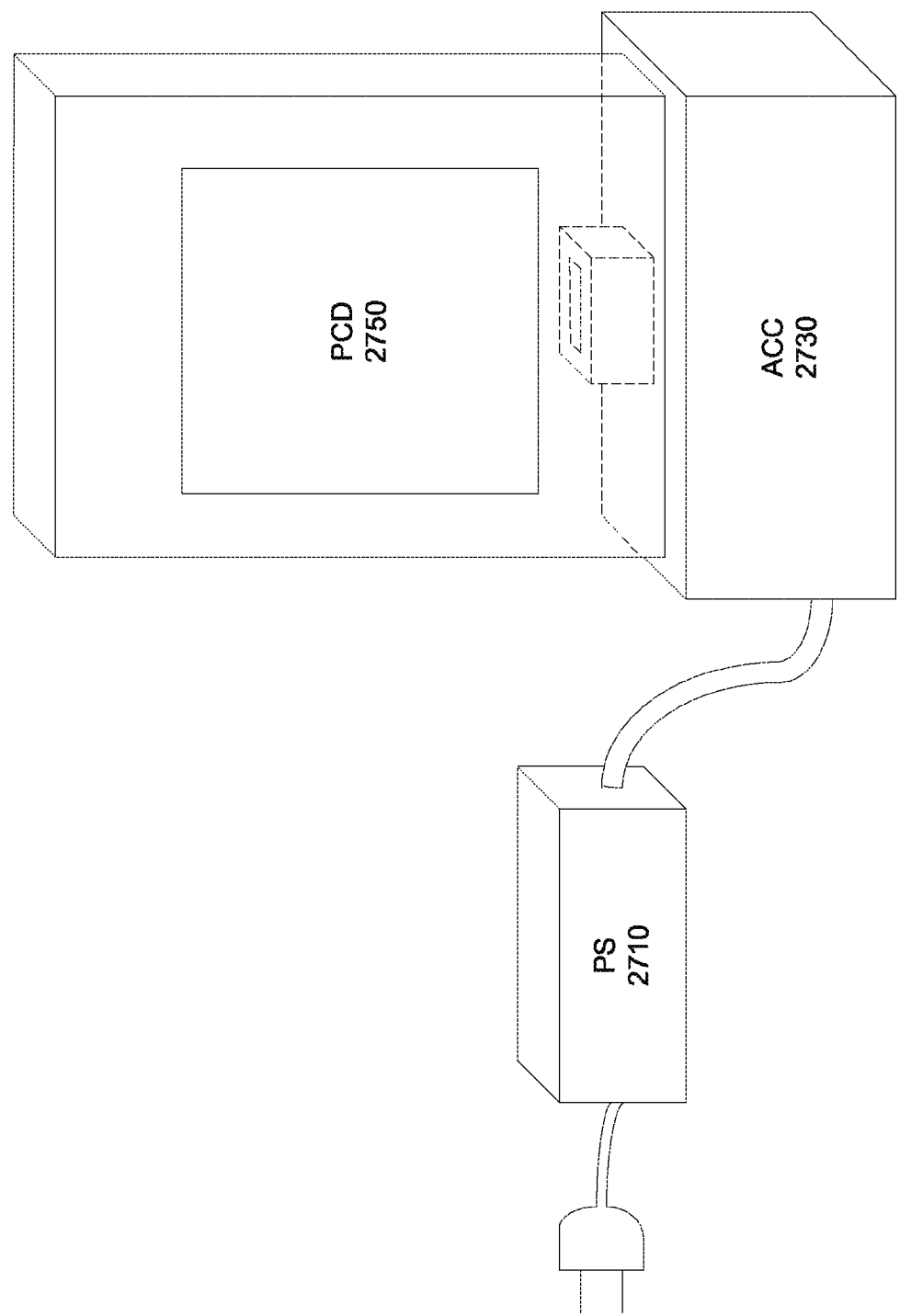
FIG. 27 illustrates an electronic system according to an embodiment of the present invention.

FIG. 27 illustrates an electronic system according to an embodiment of the present invention. This figure includes power source 2710, accessory 2730, and portable computing device 2750. Portable computing device 2750 may detect a resistor identification on accessory 2730. Portable computing device 2750 may determine default values for a number of parameters from this resistor identification. Accessory 2730 may send one or more commands to portable computing device 2750 to override or supplement these default values. That is, 1. Portable computing device 2750 detects resistor identification from accessory 2730. 2. Portable computing device 2750 determines default values from resistor identification. 3. Accessory 2730 sends commands to portable computing device 2750 to override or supplement default values. The activities performed by these devices are shown in the following figure.

Figure 28:
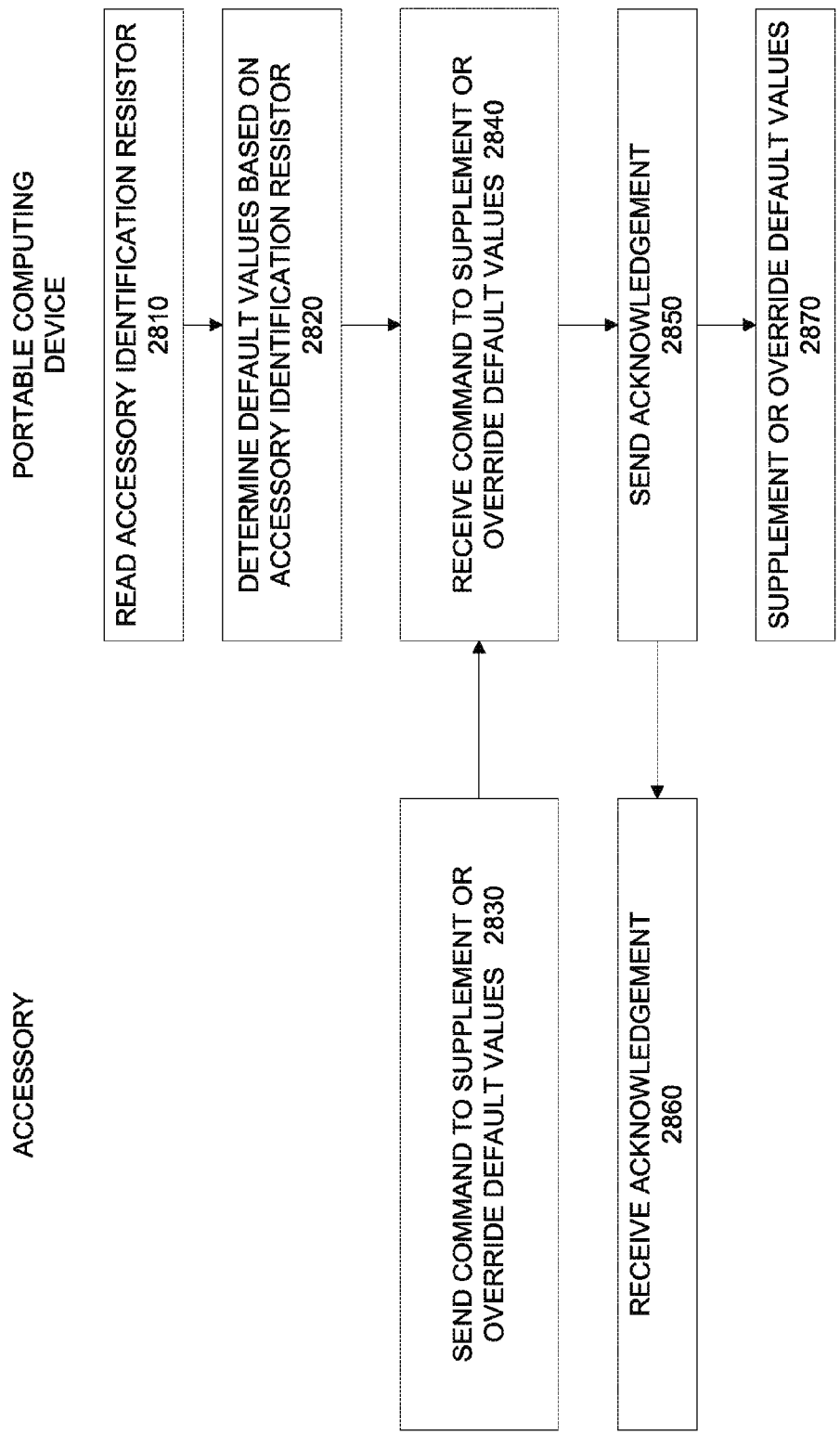
FIG. 28 illustrates the activities performed by an accessory and a portable computing device according to an embodiment of the present invention.

FIG. 28 illustrates the activities performed by an accessory and a portable computing device according to an embodiment of the present invention. In act 2810, a portable computing device may read an identification resistor on the accessory. In act 2820, the portable computing device may determine default values for various parameters based on this identification resistor. In act 2830, the accessory may send one or more commands to supplement or override the default values. This command may be received by the portable computing device in act 2840. An acknowledgement may be sent to the accessory in act 2850 and received by the accessory in act 2860. In act 2870, the portable computing device may supplement or override the default values. Notification of these changes may be provided from the portable computing device to the accessory.

Figure 29:
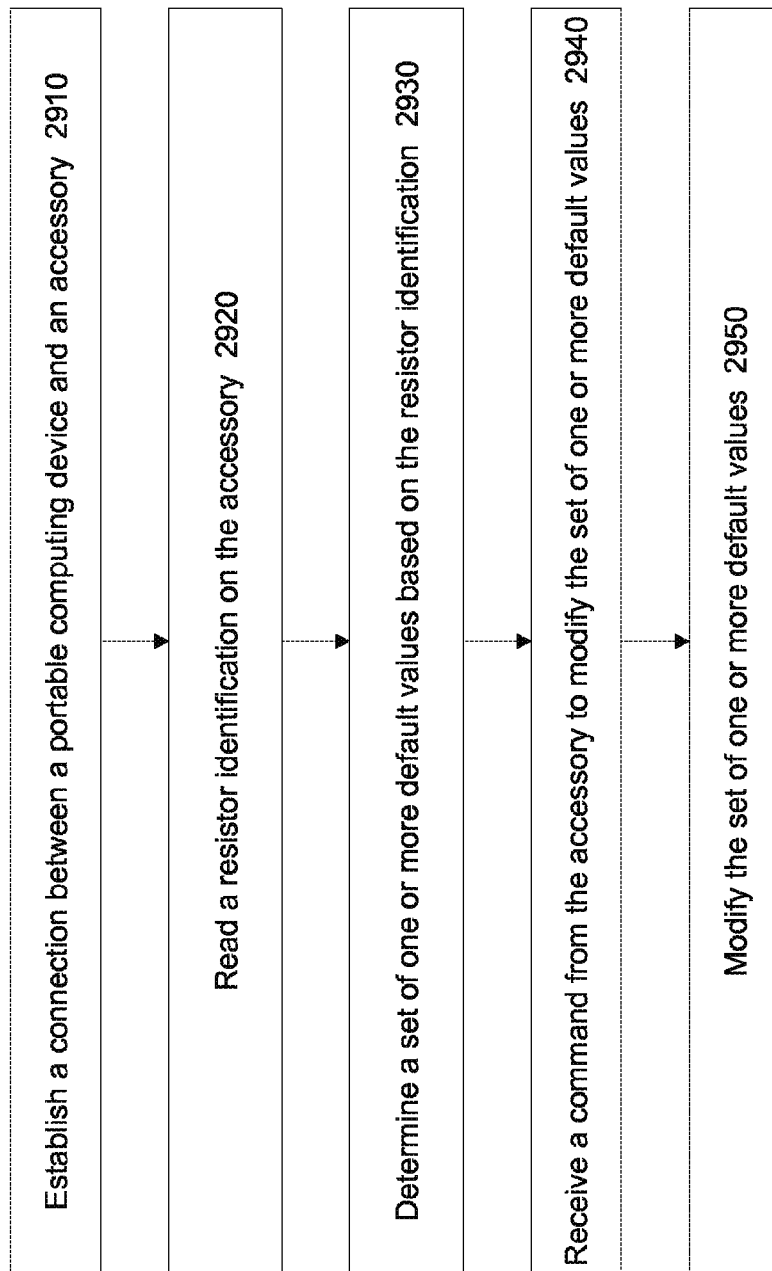
FIG. 29 is a flow chart illustrating the activities performed by an accessory and a portable computing device according to an embodiment of the present invention.

FIG. 29 is a flow chart illustrating the activities performed by an accessory and a portable computing device according to an embodiment of the present invention. In act 2910, a connection may be established between the portable computing device and the accessory. In act 2920, a resistor identification may be read on the accessory. In act 2930, the portable computing device may determine one or more default values based on the resistor identification. In act 2940, the portable computing device may receive a command from accessory to modify the set of one more default values. In act 2950, the portable computing device may modify the set of one of more default values.

The above description of embodiments of the invention has been presented for the purposes of illustration and description. It is not intended to be exhaustive or to limit the invention to the precise form described, and many modifications and variations are possible in light of the teaching above. The embodiments were chosen and described in order to best explain the principles of the invention and its practical applications to thereby enable others skilled in the art to best utilize the invention in various embodiments and with various modifications as are suited to the particular use contemplated. Thus, it will be appreciated that the invention is intended to cover all modifications and equivalents within the scope of the following claims.

What is claimed is:
1. A method of operating a computing device, the method comprising:
    establishing a connection between the computing device and a power source via a cable;
    receiving, by the computing device, an indication that the power source can supply current at a first level;
    receiving, by the computing device, an indication that the cable can supply current at a lower, second level; and
    drawing, by the computing device, a current having a limit equal to the lower second level.
2. The method of claim 1 wherein the indication that the power source can supply current at a first level is provided by a resistor value on at least one universal serial bus data (USB) pin or a voltage level on the at least one USB data pin.

3. The method of claim 1 wherein the indication that the cable can supply current at a lower second level comprises a command from the cable.

4. The method of claim 3 wherein the command from the cable comprises a maximum current limit.

5. The method of claim 1 further comprising:
providing, by the computing device, an acknowledgment to the cable that the indication that the cable can supply current at a lower, second level has been received.

6. A computing device, comprising:
an interface configured to electrically couple to a cable; and
a power managing element coupled to the interface and operable to:
establish a connection with a power source via the cable;
receive an indication that the power source can supply current at a first level;
receive an indication that the cable can supply current at a lower, second level; and
draw a current having a limit equal to the lower second level.

7. The computing device of claim 6 wherein the cable to which the interface is configured to electrically couple is a USB cable, and the indication that the power source can supply current at a first level is provided by a resistor value on at least one pin of the USB cable or a voltage level on at least one pin of the USB cable.

8. The computing device of claim 6 wherein the indication that the cable can supply current at a lower second level comprises a command from the cable.

9. The computing device of claim 8 wherein the command from the cable comprises a maximum current limit.

10. The computing device of claim 6 wherein the power managing element is further operable to provide an acknowledgment to the cable that the indication that the cable can supply current at a lower, second level has been received.

11. A method of operating a cable arranged between a power source and a computing device, the method comprising:
communicating, from the power source to the computing device, an indication that the power source can supply current at a first level;
determining a current limit of the cable at a lower, second level; and
communicating an indication of the current limit of the cable to the computing device.

12. The method of claim 11, further comprising supplying a current having a limit equal to the lower second level from the power source to the computing device.

13. The method of claim 11, further comprising receiving, from the computing device, an acknowledgement that the indication of the current limit has been received by the computing device.

14. The method of claim 11, wherein the indication of the current limit of the cable comprises a command from the cable.

15. The method of claim 14, wherein the command comprises a maximum current limit.

16. A cable, comprising:
a first end configured to be coupled to a power source; and
a second end configured to be coupled to a computing device,
wherein the cable is operable to:
communicate, from the power source to the computing device, an indication that the power source can supply current at a first level;
determine a current limit of the cable at a lower, second level; and
communicate an indication of the current limit of the cable to the computing device.

17. The cable of claim 16, wherein the cable supplies a current having a limit equal to the lower second level from the power source to the computing device.

18. The cable of claim 16, wherein the cable is further operable to receive, from the computing device, an acknowledgement that the indication of the current limit has been received by the computing device.

19. The cable of claim 16, wherein the cable communicates the indication that the power source can supply current at a first level by communicating a resistor value or a voltage level to the power source.

20. The cable of claim 16, wherein the indication of the current limit of the cable is communicated using a command generated by the cable.

* * * * *